(12) United States Patent
Kuehnle et al.

(10) Patent No.: US 9,902,322 B2
(45) Date of Patent: Feb. 27, 2018

(54) FILLING IN SURROUND VIEW AREAS BLOCKED BY MIRRORS OR OTHER VEHICLE PARTS

(71) Applicant: BENDIX COMMERCIAL VEHICLE SYSTEMS LLC, Elyria, OH (US)

(72) Inventors: Andreas U. Kuehnle, Villa Park, CA (US); Cathy L. Boon, Orange, CA (US); Zheng Li, Irvine, CA (US); Hans M. Molin, Mission Viejo, CA (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 238 days.

(21) Appl. No.: 14/927,983

(22) Filed: Oct. 30, 2015

(65) Prior Publication Data
US 2017/0120817 A1    May 4, 2017

(51) Int. Cl.
*H04N 7/18*   (2006.01)
*B60R 1/00*   (2006.01)
*H04N 5/232*  (2006.01)
*H04N 5/247*  (2006.01)

(52) U.S. Cl.
CPC ........... *B60R 1/00* (2013.01); *H04N 5/23238* (2013.01); *H04N 5/247* (2013.01); *B60R 2300/202* (2013.01); *B60R 2300/304* (2013.01); *B60R 2300/307* (2013.01)

(58) Field of Classification Search
CPC ...................................... B60R 1/00
USPC ........................................ 348/148
See application file for complete search history.

(56) References Cited

U.S. PATENT DOCUMENTS

| 5,668,675 | A | * | 9/1997 | Fredricks | ................. B60R 1/02 359/838 |
|---|---|---|---|---|---|
| 7,161,616 | B1 | | 1/2007 | Okamoto et al. | |
| 7,602,276 | B2 | | 10/2009 | Dinu | |
| 8,035,575 | B2 | | 10/2011 | Okabe et al. | |

(Continued)

FOREIGN PATENT DOCUMENTS

| CN | 103625366 | 3/2014 |
|---|---|---|
| CN | 103985134 | 8/2014 |

(Continued)

OTHER PUBLICATIONS

International Search Report and Written Opinion from corresponding International Application No. PCT/US2016/059036, dated Jan. 31, 2017.

*Primary Examiner* — Leron Beck
(74) *Attorney, Agent, or Firm* — Tucker Ellis, LLP

(57) ABSTRACT

An imaging system, method, and computer readable medium filling in blind spot regions in images of peripheral areas of a vehicle. Intrinsic or extrinsic blind spot data is used together with vehicle movement data including vehicle speed and steering angle information to determine one or more portions of a series of images of the peripheral areas that include or will include one or more blind spot obstructions in the images. Portions of the images predicted to be obstructed at a future time, portions of overlapping images obtained concurrently from plural sources, or both, are obtained and used as an image patch. A blind spot region restoration unit operates to stitch together a restored image without the blind spot obstruction by merging one or more image patches into portions of the images that include the one or more blind spot obstructions.

32 Claims, 13 Drawing Sheets

(56) References Cited

U.S. PATENT DOCUMENTS

| | | | |
|---|---|---|---|
| 8,089,512 B2 | 1/2012 | Okabe et al. | |
| 8,094,190 B2 | 1/2012 | Kubota et al. | |
| 8,854,197 B2 | 10/2014 | Ikeda et al. | |
| 2009/0244741 A1* | 10/2009 | Schondorf | B60R 1/072 359/843 |
| 2010/0220406 A1* | 9/2010 | Cuddihy | B60R 1/025 359/843 |
| 2010/0265600 A1* | 10/2010 | Okuda | B60R 1/02 359/843 |
| 2013/0300872 A1 | 11/2013 | Park | |
| 2014/0071278 A1 | 3/2014 | Musaid | |
| 2014/0347469 A1 | 11/2014 | Wende et al. | |
| 2015/0103172 A1 | 4/2015 | Seiya | |
| 2015/0156383 A1 | 6/2015 | Biemer | |

FOREIGN PATENT DOCUMENTS

| | | |
|---|---|---|
| EP | 2193957 A2 | 6/2010 |
| EP | 2 487 666 | 8/2012 |
| EP | 2860691 A2 | 4/2015 |
| JP | 2014-235639 | 12/2014 |
| KR | 1435659 | 8/2014 |
| KR | 1439369 | 9/2014 |
| WO | 2014094941 | 6/2014 |

\* cited by examiner

FILLING IN SURROUND VIEW AREAS BLOCKED BY MIRRORS OR OTHER VEHICLE PARTS

TECHNICAL FIELD

The embodiments herein relate generally to vision/imaging systems and more specifically to vehicle corner and/or surround view camera systems providing an unobstructed bird's eye view of one or more regions surrounding a vehicle such as a cargo truck. The example embodiments herein will be described in connection with a first application using a single side-placed camera for a non-articulated cargo truck, and a second application using a system of two (2) cameras including a side-placed first camera and a front/corner-placed second camera for a non-articulated cargo truck. However, it is to be appreciated that the embodiments are not limited to only these applications, but also find use in many other applications including for example 360° surround view camera systems and in other mobile or stationary systems including one or more image obtaining unis.

BACKGROUND

It is common to place cameras on vehicles for purposes of providing one or more images of areas surrounding the vehicle to an operator. This helps to improve the awareness of the operator relative to conditions near the vehicle for avoiding collisions and to assist in maneuvering the vehicle for parking or movement near loading docks or the like. For these reasons and for purposes of attempting to provide a "surround view" of the area around the vehicle, cameras have been located at various positions on the vehicle such as for example at the front end, rear, left side, and right side. These cameras offer the operator various views relative to the vehicle including forward, rear, left and right views. In some applications, the set of views are combined by abutting or "stitching" these into a single image for display on the dashboard of the vehicle or the like to provide live panoramic or bird's eye views of the vehicle in its current setting for the convenience of the operator.

Surround view cameras may be advantageously mounted at the corners of selected structure of the vehicles. However, the view at these corners is often blocked by mirrors or other protuberances intrinsic to the vehicle, leading to obstructed or blank spots in the resultant surround view making it difficult for the driver to see a complete image of peripheral areas relative to the vehicle. In addition, during use of the surround view camera systems, objects adjacent the vehicle might block the images obtained by the one or more cameras. These other protuberances or structures extrinsic to the vehicle also lead to obstructed or blank spots in the resultant surround view making it difficult for the driver to see a complete image of peripheral areas relative to the vehicle.

It is therefore desirable to provide a vehicle surround view system without these limitations and which provides realistic, life-like, images to a vehicle operator without introducing any blind spots or blind spot artifacts or other confusion into the image and, in particular, to provide a vehicle surround view system that can fill in surround view areas blocked by vehicle parts such as mirrors or blocked by other extrinsic objects or the like.

BRIEF SUMMARY OF EXAMPLE EMBODIMENTS

The embodiments herein provide, in general, the filling in of partial obstructions contained in images of peripheral areas of an associated moving object, such as a vehicle for example. The example embodiments herein describing the general concepts are related to motor vehicles for ease of describing the embodiments, but the applicability of the advantageous techniques and structural combinations are not limited to application in only motor vehicles. Rather, the embodiments herein provide the filling in of partial obstructions contained in images obtained of areas peripheral to an associated object in applications when there is relative movement between the object and the areas peripheral to the object as well as in static applications when there is no relative movement between the object and the areas peripheral to the object.

In accordance with particular example embodiments, an imaging system, method, and computer readable medium fills in blind spot regions in images of peripheral areas of a vehicle. Intrinsic or extrinsic blind spot data is used together with vehicle movement data including vehicle speed information, steering angle information, and other information relating to the vehicle as necessary or desired to determine one or more portions of a series of images of the peripheral areas that include or will include one or more blind spot obstructions in the images. Portions of the images predicted to be obstructed at a future time, portions of overlapping images obtained concurrently from plural sources, or both, are obtained and used as an image patch. A blind spot region restoration unit operates to stitch together a restored image without the blind spot obstruction by merging one or more image patches into portions of the images that include the one or more blind spot obstructions.

In accordance with a further particular example embodiment, an imaging system fills in blind spot regions in peripheral areas of an associated moving vehicle. The system includes a processor and a non-transient memory operatively coupled with the processor. Also operatively coupled with the processor, the system includes an image obtaining unit, a predicted blind spot region determining unit and a current blind spot region restoration unit. The non-transient memory stores intrinsic blind spot data representative of a blind spot region of a peripheral area of the associated vehicle, and movement data representative of a speed of movement of the associated vehicle. The image obtaining unit is configured to receive first image data representative of a first image of the peripheral area of the associated vehicle captured at a first time, and to receive second image data representative of a second image of the peripheral area of the associated vehicle captured at a second time after the first time. The predicted blind spot region determining unit is configured to determine, at the first time, a portion of the first image predicted to be in the blind spot region at the second time in accordance with the intrinsic blind spot data and the movement data. The current blind spot region restoration unit is configured to generate, at the second time, restored second image data by merging: i) a selected portion of the first image data corresponding to the portion of the first image predicted to be in the blind spot region at the second time, with ii) the second image data. The generated restored second image data is representative of a restored second image of the peripheral area of the associated vehicle at the second time unobstructed by the blind spot region.

In accordance with yet a further particular example embodiment, the image obtaining unit includes first and second cameras. The first camera is configured to capture, at a first time from a first perspective relative to the associated vehicle, the first image data representative of the first image of the peripheral area of the associated vehicle, and to capture, at a second time from the first perspective, the second image data representative of the second image of the peripheral area of the associated vehicle at the second time. The second camera is configured to capture, at the first time from a second perspective relative to the associated vehicle different than the first perspective, auxiliary image data representative of an auxiliary image of the peripheral area of the associated vehicle. In one form, a blind spot overlap region determining unit operatively coupled with the processor is configured to determine a first portion of the first image in the blind spot region at the first time, and a first portion of the auxiliary image overlapping the first portion of the first image in the blind spot region at the first time. Thereafter, the current blind spot region restoration unit generates restored first image data by merging: i) a first portion of the auxiliary image data corresponding to the first portion of the auxiliary image overlapping the first portion of the first image in the blind spot region at the first time, with ii) the first image data at a first portion of the first image data corresponding to the first portion of the first image in the blind spot region at the first time, wherein the generated restored first image data is representative of a restored first image of the peripheral area of the associated vehicle at the first time unobstructed by the blind spot region. In another form, the blind spot overlap region determining unit determines a first portion of the auxiliary image overlapping the portion of the first image predicted to be in the blind spot region at the second time. Thereafter, the current blind spot region restoration unit generates the restored second image data by merging: i) a first portion of the auxiliary image data corresponding to the first portion of the auxiliary image overlapping the portion of the first image predicted to be in the blind spot region at the second time, with ii) the second image data at a first portion of the second image data corresponding to the first portion of the second image in the blind spot in accordance with the intrinsic blind spot data and the movement data, wherein the generated restored second image data is representative of a restored second image of the peripheral area of the associated vehicle at the second time unobstructed by the blind spot region.

In accordance with yet a still further particular example embodiment, a method in an associated imaging system fills in a blind spot region in a peripheral area of an associated vehicle. In accordance with the method, intrinsic blind spot data representative of a blind spot region of a peripheral area of the associated vehicle is stored in a non-transient memory operatively coupled with a processor of the associated imaging system. Movement data representative of a speed of movement of the associated vehicle is stored in the non-transient memory. The method includes obtaining, at a first time, first image data using an image obtaining unit operatively coupled with the processor of the associated imaging system, the first image data being representative of a first image of the peripheral area of the associated vehicle captured at a first time. The method further includes obtaining, at the first time, auxiliary image data using the image obtaining unit operatively coupled with the processor of the associated imaging system, the auxiliary image data being representative of an auxiliary image of the peripheral area of the associated vehicle captured at the first time. The method further includes determining, by a blind spot overlap region determining unit operatively coupled with the processor and in accordance with the intrinsic blind spot data and the movement data: a first portion of the first image in the blind spot region at the first time; and a first portion of the auxiliary image overlapping the first portion of the first image in the blind spot region at the first time. The method still further includes generating, by a current blind spot region restoration unit operatively coupled with the processor, restored first image data by merging: i) a first portion of the auxiliary image data corresponding to the first portion of the auxiliary image overlapping the first portion of the first image in the blind spot region at the first time, with ii) the first image data at a first portion of the first image data corresponding to the first portion of the first image in the blind spot region at the first time, wherein the generated restored first image data is representative of a restored first image of the peripheral area of the associated vehicle at the first time unobstructed by the blind spot region.

In accordance with yet a still further particular example embodiment, a method in an associated imaging system fills in a blind spot region in a peripheral area of an associated vehicle. In accordance with the method, intrinsic blind spot data representative of a blind spot region of a peripheral area of the associated vehicle is stored in a non-transient memory operatively coupled with a processor of the associated imaging system. Movement data representative of a speed of movement of the associated vehicle is stored in the non-transient memory. The method includes obtaining, at a first time, first image data using an image obtaining unit operatively coupled with the processor of the associated imaging system, the first image data being representative of a first image of the peripheral area of the associated vehicle at the first time. The method further includes obtaining, at a second time after the first time, second image data using the image obtaining unit, the second image data being representative of a second image of the peripheral area of the associated vehicle at a second time after the first time. The method further includes determining, at the first time by a predicted blind spot region determining unit operatively coupled with the processor of the associated imaging system, a portion of the first image predicted to be in the blind spot region at the second time in accordance with the intrinsic blind spot data and the movement data. The method further includes generating, at the second time by a current blind spot region restoration unit operatively coupled with the processor of the associated imaging system, restored second image data by merging: i) a selected portion of the first image data corresponding to the portion of the first image predicted to be in the blind spot region at the second time, with ii) the second image data, wherein the generated restored second image data is representative of a restored second image of the peripheral area of the associated vehicle at the second time unobstructed by the blind spot region.

In accordance with a still yet further particular example embodiment, a non-transitory computer readable storage medium stores one or more sequences of instructions executable by one or more processors for filling in a blind spot region in a peripheral area of an associated vehicle. The instructions, when executed by the one or more processors, cause the one or more processors to execute steps including storing intrinsic blind spot data representative of a blind spot region of a peripheral area of the associated vehicle in a non-transient memory operatively coupled with a processor of the associated imaging system, and storing movement data representative of a speed of movement of the associated vehicle in the non-transient memory. The instructions when executed cause the additional step of obtaining, at a first time, first image data using an image obtaining unit operatively coupled with the processor of the associated imaging system, the first image data being representative of a first image of the peripheral area of the associated vehicle at the first time. The instructions when executed cause the additional step of obtaining, at a second time after the first time, second image data using the image obtaining unit, the second image data being representative of a second image of the peripheral area of the associated vehicle at a second time after the first time. The instructions when executed cause the additional step of determining, at the first time by a predicted blind spot region determining unit operatively coupled with the processor of the associated imaging system, a portion of the first image predicted to be in the blind spot region at the second time in accordance with the intrinsic blind spot data and the movement data. The instructions when executed cause the additional step of generating, at the second time by a current blind spot region restoration unit operatively coupled with the processor of the associated imaging system, restored second image data by merging: i) a selected portion of the first image data corresponding to the portion of the first image predicted to be in the blind spot region at the second time, with ii) the second image data, wherein the generated restored second image data is representative of a restored second image of the peripheral area of the associated vehicle at the second time unobstructed by the blind spot region.

BRIEF DESCRIPTION OF THE DRAWINGS

The foregoing and other features of the embodiments herein will become apparent to those skilled in the art to which the present imaging system, method, and computer readable medium filling in blind spot regions in images of peripheral areas of a vehicle relate upon reading the following description with reference to the accompanying drawings, in which:

FIG. 1b is a schematic top plan view showing a generalized obstructed field of view of the first camera installed in the vehicle of FIG. 1a;

FIG. 1c is a schematic top plan view showing the generalized obstructed field of view of the first camera installed in the vehicle of FIG. 1a in combination with the field of view of a second camera installed in the vehicle of FIG. 1a;

DETAILED DESCRIPTION OF EXAMPLE EMBODIMENTS

Figure 1A:
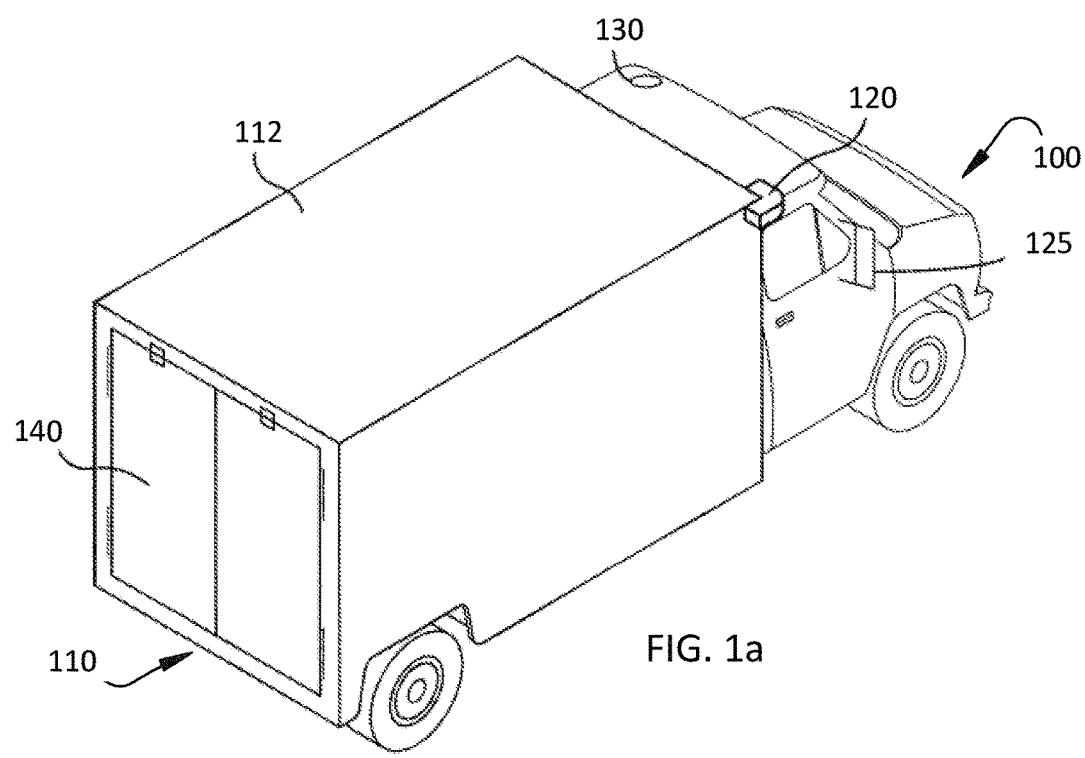
FIG. 1a is a perspective view of a vehicle in which an imaging camera system according to an embodiment is applied, showing an installation condition of a single first camera on the vehicle.

With reference now to the drawing Figures, wherein the showings are for purposes of describing the embodiments only and not for purposes of limiting same, example embodiments herein relate to a surround view camera system 100 for vehicles having one or more cameras placed at selected positions on the vehicles, and to systems and methods for providing unobstructed images from the surround view camera systems. The embodiments herein are also applicable to the placement of the one or more cameras at various positions on the vehicles such as, for example, at the corners of the vehicles, and at corners of various one or more substantially rectangular portions of the vehicles. It is to be appreciated that the embodiments herein are applicable to many different camera placement schemes and to many different camera types having various fields of view, resolution, and other characteristics as may be necessary or desired.

Figure 1B:
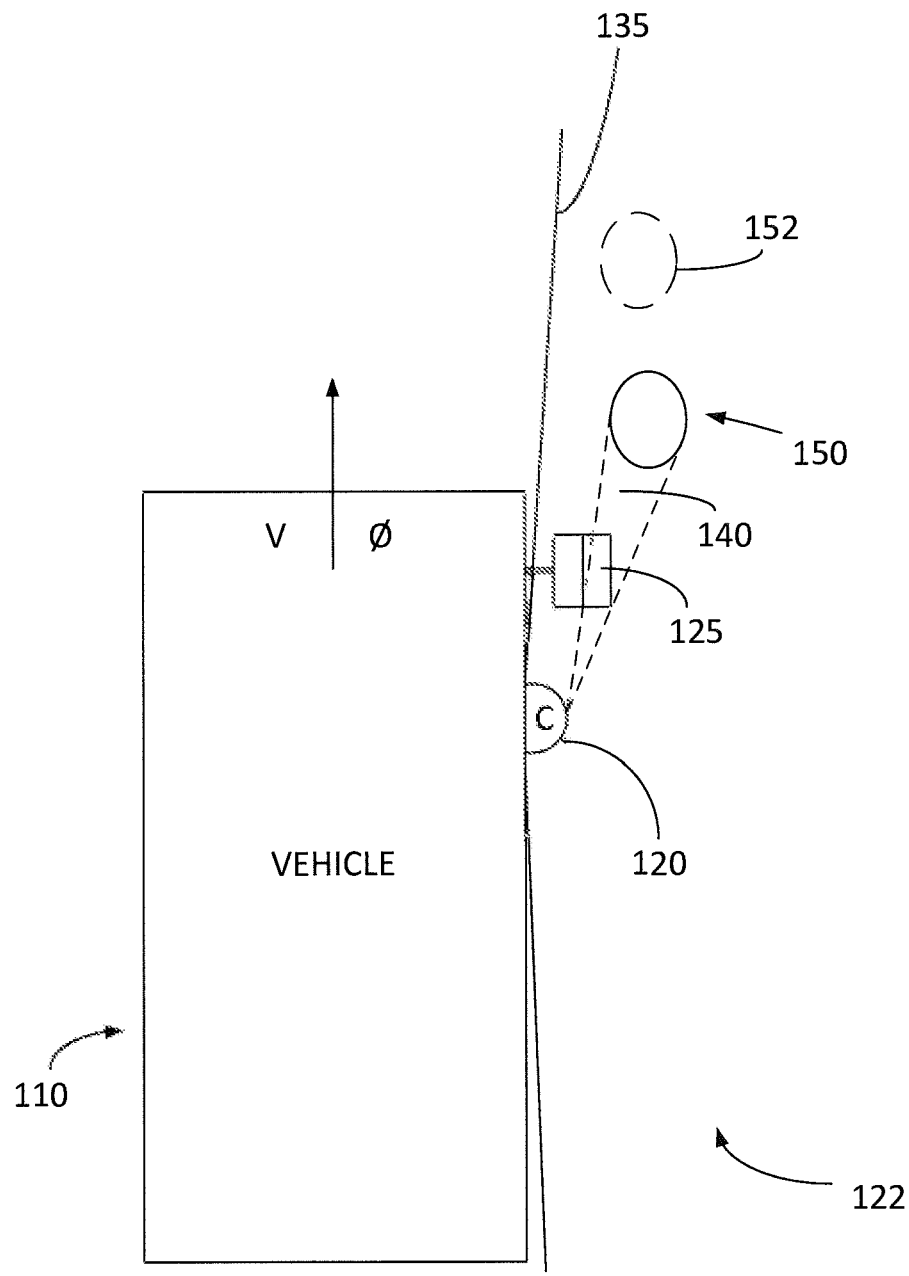
Figure 1C:
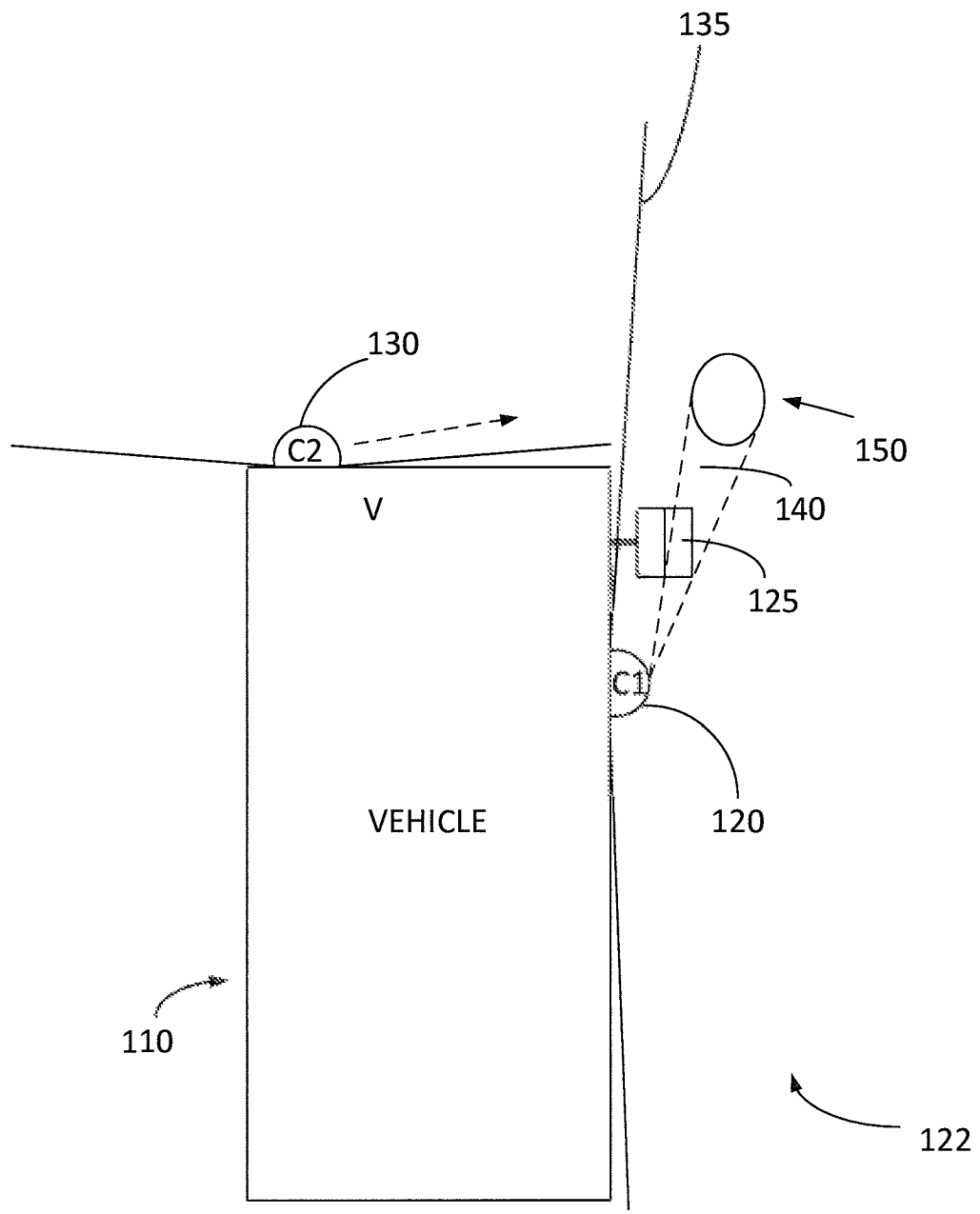

As representative of the embodiments and with reference in particular first to FIG. 1a, the perspective top view shown there illustrates a vehicle 110 in which a surround view camera system 100 according to an embodiment is applied, showing an arrangement of cameras 120, 130 supported at selected positions on the body 140 of the vehicle 110. FIGS. 1b and 1c are schematic top plan views showing a field of view of each camera 120, 130 installed on the body 140 of the vehicle 110 of FIG. 1a.

Although a basic delivery panel-type truck 112 is shown as the vehicle 110 in FIGS. 1a-1c, the vehicle 110 can be any other vehicle such as a regular passenger automobile or any other type of mobile or stationary apparatus having an overall generally rectangular shape. Also, of course the illustrated panel-type truck 112 vehicle 110 illustrated is configured to be located on and move relative to the ground such as a road surface or the like, other vehicles that would be benefitted by the surround view camera systems 100 of the various embodiments herein include various stationary surveillance systems or the like, or robotic devices such as automatic guided vehicles (AGVs) configured to be located on and move relative to the floor of a factory or manufacturing facility or the like. In the following explanations of the example embodiments, the ground is assumed to be a horizontal plane for purposes of planarity calculations and the like, and the "height" of these one or more cameras indicates a height with respect to the ground.

As shown in FIG. 1a, cameras (image pickup devices) 120 and 130 are mounted at the uppermost parts of the vehicle 110. The first camera 120 is placed for example at a right uppermost forward part of the cargo portion of the vehicle 110, and the second camera 130 is placed for example at the left upper most top part of the cab of the vehicle 110. The cameras 120 and 130 simply may be referred to herein and below in this and in the embodiments to be described as an image obtaining unit, the cameras, or each camera, without necessarily being distinguished from each other. Although the cameras are arranged as shown, their positions may equivalently be exchanged in accordance with the embodiment into several relative positions such as, for example, by locating the first camera 120 at the left upper most forward part of the vehicle 110, and locating the second camera 130 at the right upper most rearward part of the vehicle 110. The field of view of the first camera 120 is obstructed by a side view mirror 125 affixed to the passenger door of the vehicle. The field of view of the second camera, however, is unobstructed because of its relative placement on top of the cab of the vehicle.

It is to be appreciated that the cameras 120 and 130 are arranged on the vehicle 110 such that an optical axis of the first camera 120 is directed obliquely downward at an angle of about 15°-45° towards the forward and side directions of the vehicle 110 and, similarly, an optical axis of the second camera 130 is directed obliquely downward at an angle of about 15°-45° towards the frontward direction of the vehicle 110. It is to be further appreciated that the field of view of each image obtaining unit or camera, i.e. spatial region of which each camera can capture an image, is generally hemispherical in overall shape and is quite large. More particularly, in the embodiment illustrated, the cameras 120 and 130 each have a field of view of about 180° and are commonly referred to in the industry as "fish eye" lens cameras or imagers. The cameras 120 and 130 may be of the type Blue Eagle DC3K-1-LVD available from Silicon Micro Systems, or any similar cameras available from other sources and having the desired characteristics of the embodiments.

FIG. 1*b* shows the usable field of view 122 of the first camera 120 viewed from above, in other words, the portion of the generally hemispherical field of view of the forward/side directed first image obtaining unit or camera 120 as projected onto the generally planar ground surface at the front of the vehicle 110. The remaining portion of the generally hemispherical field of view of the forward/side directed first camera 120 is, in general, obstructed by the gross front shape of the vehicle 110 in that region. In addition, the mirror 125 blocks an area 140 of the field of view 135 wherein an area such as for example area 150 potentially surrounding an object (not shown) near the vehicle is currently blocked by the mirror as viewed in the drawing, and a second area 152, though currently visible, will be blocked by the mirror in the future such as, for example, at a next image frame captured by the camera 120.

Similarly, FIG. 1*c* shows the usable field of view 132 of the second camera 130 viewed from above, in other words, the portion of the generally hemispherical field of view of the rearward and rearward directed second camera as projected onto the ground surface at the front of the vehicle 110. The field of view 132 of the second camera 130 overlaps the field of view 135 the first camera 120 so that, in the two (2) camera embodiment illustrated, the area such as for example the area 150 blocked by the mirror relative to the first camera 120 is directly observable by the second camera 120. That is, the area 150 is simultaneously blocked from view relative to the first camera 120 while being viewable by the second camera 130.

It is to be appreciated that, in the illustrated embodiment, the forward directed first camera 120 primarily captures an image of a subject or object, including the road surface, located within a predetermined region in the front and to the right side of the vehicle 110. Similarly in the illustrated embodiment, the forward directed second camera 130 primarily captures an image of a subject or object, including the road surface, positioned within a predetermined region in front and to the left and right sides of the vehicle 110. The fields of view 135 and 132 of the cameras 120 and 130, however, overlap in a region. The overlap region is referred to in this embodiment and in other embodiments herein as the common or overlapping fields of view.

Figure 2A:
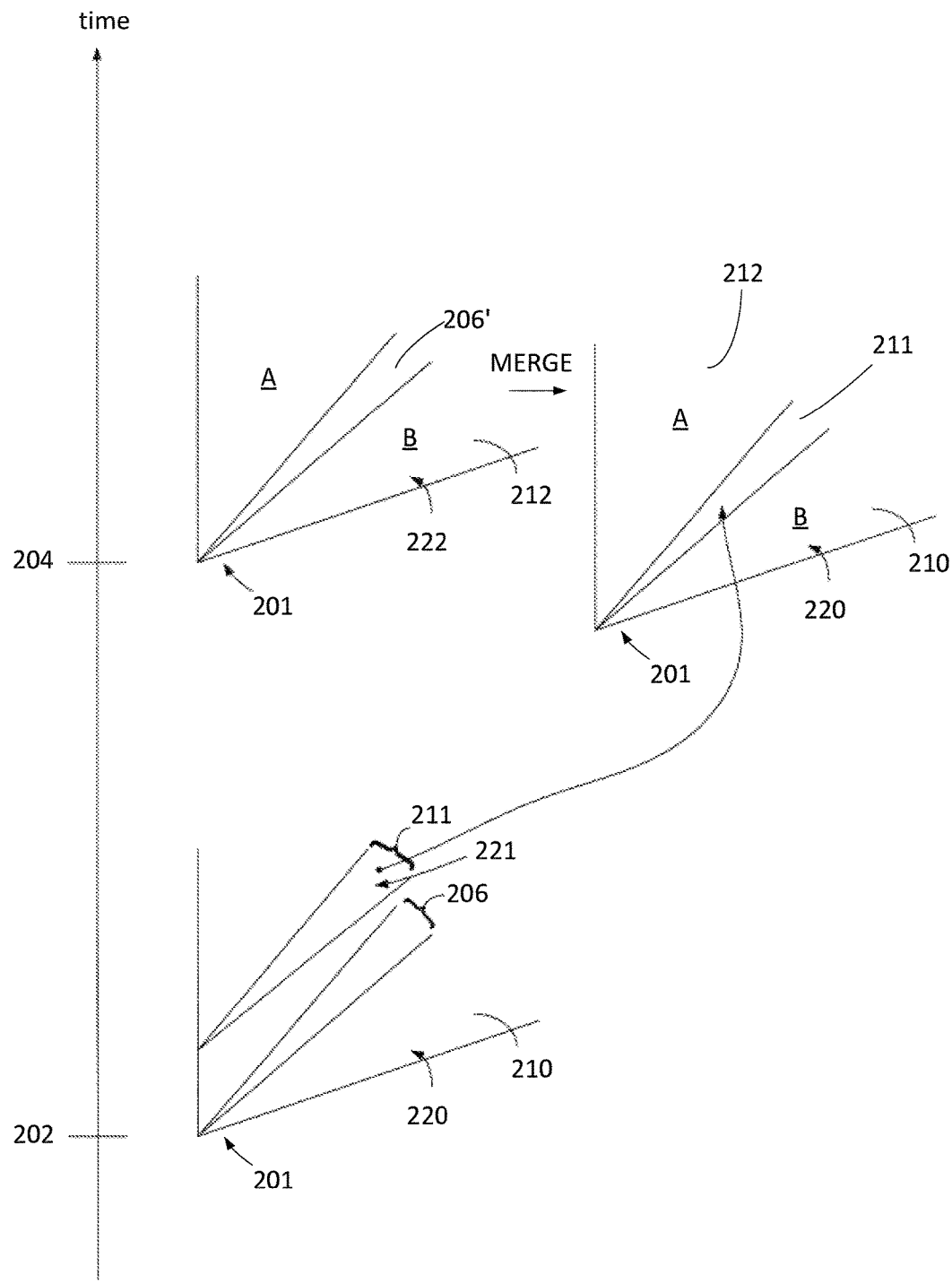
FIG. 2a is a schematic plan view illustration of a series of first and second images obtained by the imaging camera system of FIGS. 1a and 1b at respective first and second times.

FIG. 2*a* is a schematic plan view illustration in accordance with an embodiment using a single camera imaging over a time period, of a series of first 210 and second 212 images obtained by the imaging camera system of FIGS. 1*a* and 1*b* at respective first 202 and second 204 times as the vehicle moves forward relative to the areas peripheral to the vehicle. In accordance with an embodiment, an image obtaining unit operatively coupled with a processor is configured to receive first image data 220 representative of the first image 210 of the peripheral area shown generally at 201 of the associated vehicle captured at the first time 202. The first image data 220 may be pixel data, for example, representative of the first image 210 of the peripheral area. Similarly, the image obtaining unit is configured to receive second image data 222 representative of the second image 212 of the peripheral area 201 of the associated vehicle captured at the second time 204 after the first time 202. Also similarly, the second image data 222 may be pixel data, for example, representative of the second image 212 of the peripheral area. As shown, the first image 210 is blocked by an obstruction (such as the mirror 125) resulting in a blind spot region 206 in the first image 210.

A predicted blind spot region determining unit described in greater detail below is configured to determine, at the first time 202, a portion 211 of the first image 210 predicted to be in the blind spot region 206' at the second time 204 in accordance with the intrinsic blind spot data and the movement data. A current blind spot region restoration unit also to be described in greater detail below is configured to generate, at the second time 204, restored second image data 210' by merging a selected portion 221 of the first image data corresponding to the portion 211 of the first image predicted to be in the blind spot region 206' at the second time 204, with the second image data 222. In the example embodiment, the generated restored second image data 210' is representative of a restored second image 212 of the peripheral area of the associated vehicle at the second time 204 unobstructed by the blind spot region 206. The generated restored second image data 210' comprises first A and second B portions of the second image 212, combined with the portion 211 of the first image predicted to be in the blind spot region 206' at the second time 204. The portion is, essentially, "stitched" into the generated restored second image data 210' between the first A and second B portions of the second image 212, thereby eliminating the blind spot in the restored second image data 210' relative to the original second image data 210 obtained at the second time 204.

Figure 2B:
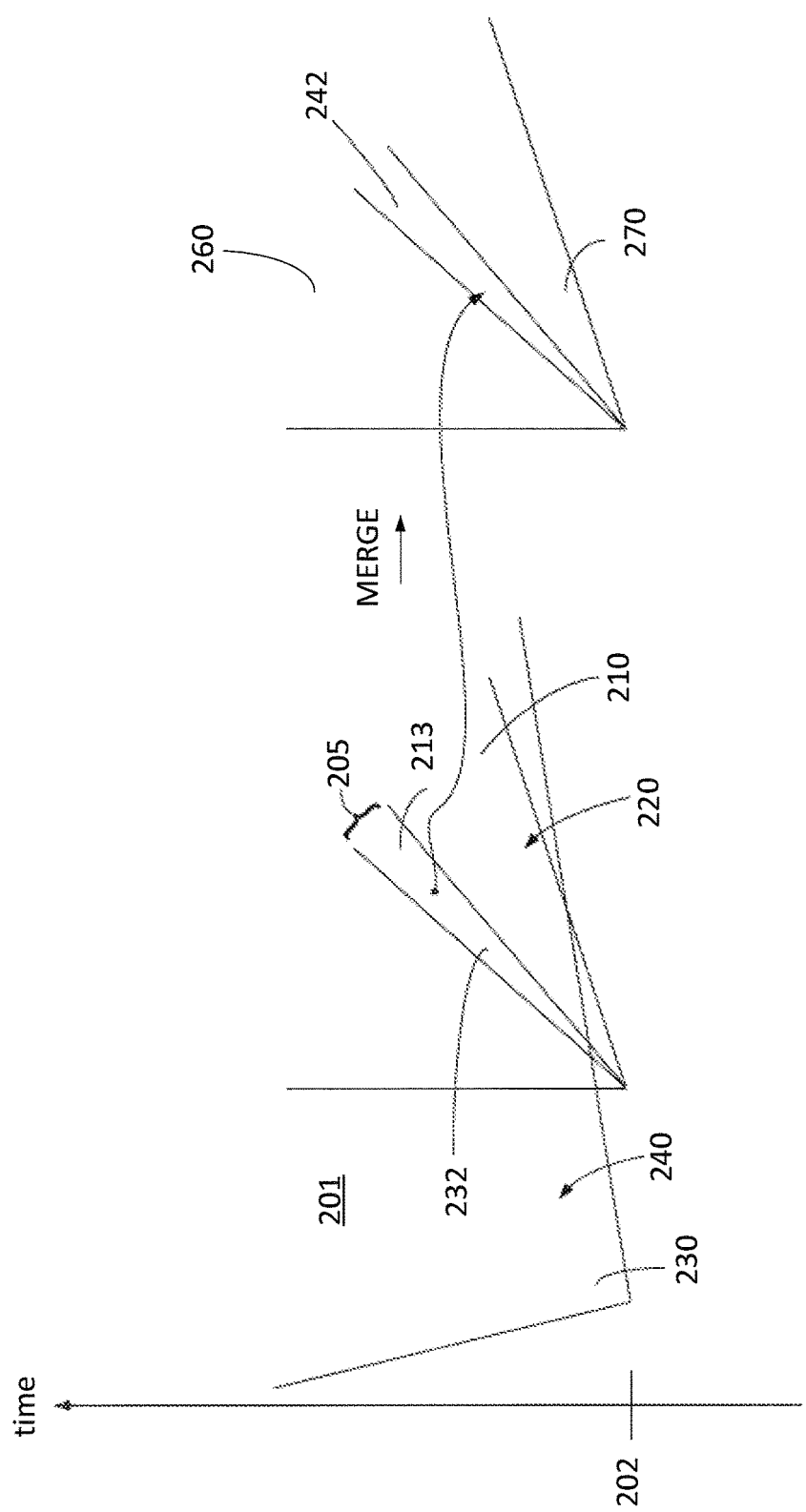
FIG. 2b is a schematic plan view illustration of a first image obtained by the imaging camera system of FIG. 1c at a first time.

FIG. 2*b* is a schematic plan view illustration in accordance with a further embodiment of a first image obtained by the imaging camera system of FIG. 1*c* at a first time. The imaging camera system of FIG. 1*c* includes two (2) image obtaining units; namely first and second cameras 120, 130 with overlapping fields of view, wherein the cameras obtain their respective images simultaneously, including the overlapping region. The first camera 120 is configured to capture, at the first time 202 from a first perspective relative to the associated vehicle, first image data 220 representative of the first image 210 of the peripheral area 201 of the associated vehicle. Similarly, the second camera 130 is configured to capture, at the same first time 202 from a second perspective relative to the associated vehicle different than the first perspective, auxiliary image data 240 representative of an auxiliary image 230 of the peripheral area 201 of the associated vehicle. A blind spot overlap region determining unit to be described below in greater detail is configured to determine, at the first time 202 in accordance with intrinsic blind spot data, a first portion 213 of the first image 210 in the blind spot 205 at the first time 202, and a first portion 232 of the auxiliary image overlapping the first portion 213 of the first image 210 in the blind spot 205 at the first time 202.

With continued reference to FIG. 2*b*, a current blind spot region restoration unit to be described in greater detail below is configured to generate restored first image data 260 by merging a first portion 242 of the auxiliary image data corresponding to the first portion 232 of the auxiliary image overlapping the first portion 213 of the first image 210 in the blind spot 205 at the first time 202, with the first image data 210 at a first portion of the first image data corresponding to the first portion of the first image in the blind spot region at the first time 202. The generated restored first image data 260 is representative of a restored first image 270 of the peripheral area of the associated vehicle at the first time unobstructed by the blind spot region. The restored first image data 260 is, essentially, the first portion 232 of the auxiliary image stitched into the first image data 220 at a location formerly taken by the first portion 213 of the first image 210 in the blind spot 205, thereby eliminating the blind spot in the restored first image 270 at the first time 202.

Figure 2C:
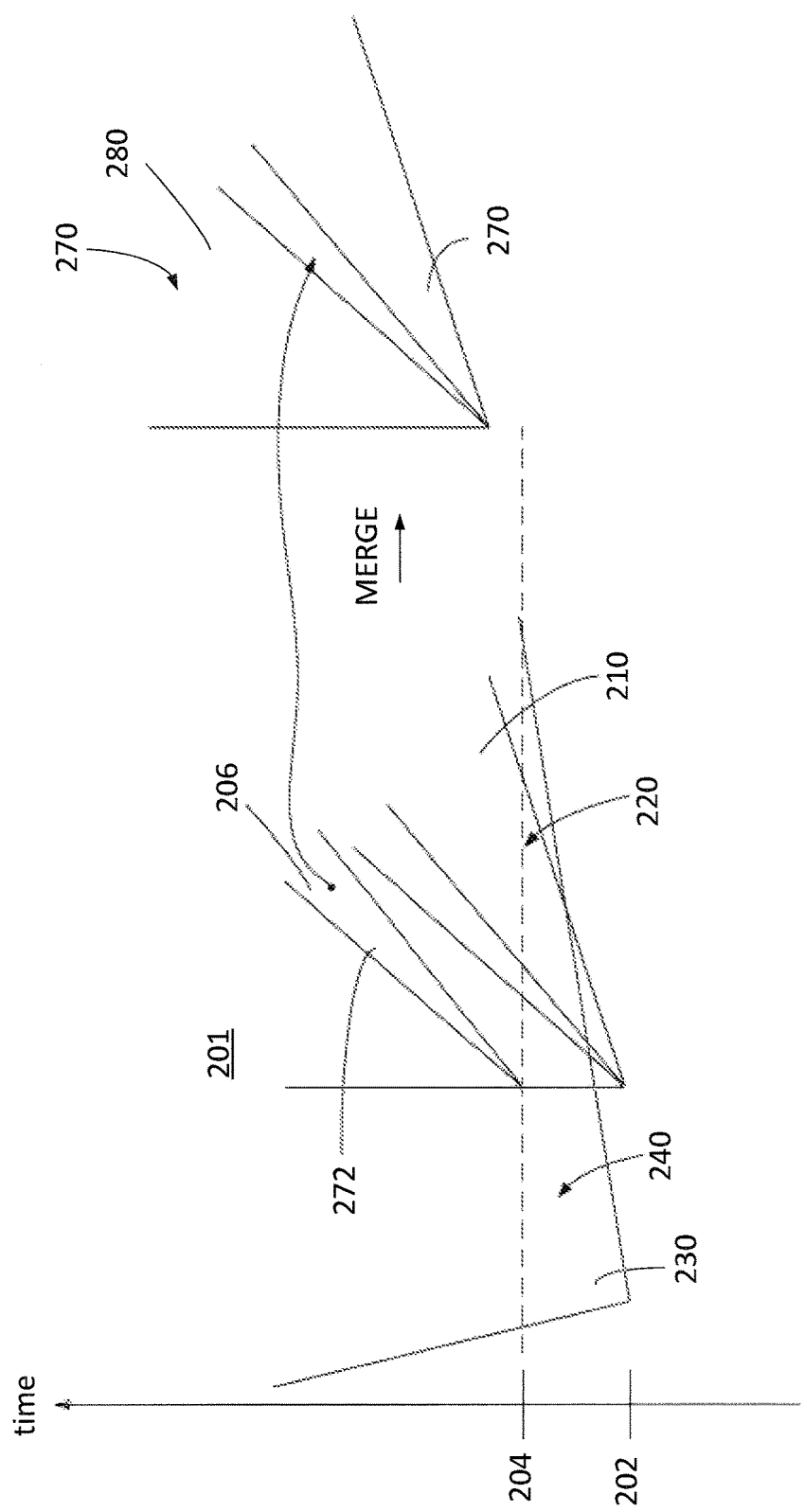
FIG. 2c is a schematic plan view illustration of a series of first and second images obtained by the imaging camera system of FIG. 1c at respective first and second times.

FIG. 2*c* is a schematic plan view illustration in accordance with a further embodiment of a series of first and second images obtained by the imaging camera system of FIG. 1*c* at respective first and second times. The imaging camera system of FIG. 1*c* includes two (2) image obtaining units; namely first and second cameras 120, 130 with overlapping fields of view. The first camera 120 is configured to capture, at the first time 202 from a first perspective relative to the associated vehicle, first image data 220 representative of the first image 210 of the peripheral area 201 of the associated vehicle. Similarly, the second camera 130 is configured to capture, at the first time 202 from a second perspective relative to the associated vehicle different than the first perspective, auxiliary image data 240 representative of an auxiliary image 230 of the peripheral area 201 of the associated vehicle. A blind spot overlap region determining unit to be described below in greater detail is configured to determine, in accordance with the intrinsic blind spot data and the movement data, a first portion 272 of the auxiliary image 230 overlapping the portion 206 of the first image 210 predicted to be in the blind spot region at the second time 204.

The current blind spot region restoration unit is configured to generate the restored second image data 270 by merging a first portion 272 of the auxiliary image data corresponding to the first portion of the auxiliary image overlapping the portion 206 of the first image 210 predicted to be in the blind spot region at the second time 204, with the second image data at a first portion of the second image data corresponding to the first portion of the second image in the blind spot in accordance with the intrinsic blind spot data and the movement data. The generated restored second image data 270 is representative of a restored second image 280 of the peripheral area of the associated vehicle at the second time unobstructed by the blind spot region.

Figure 3:
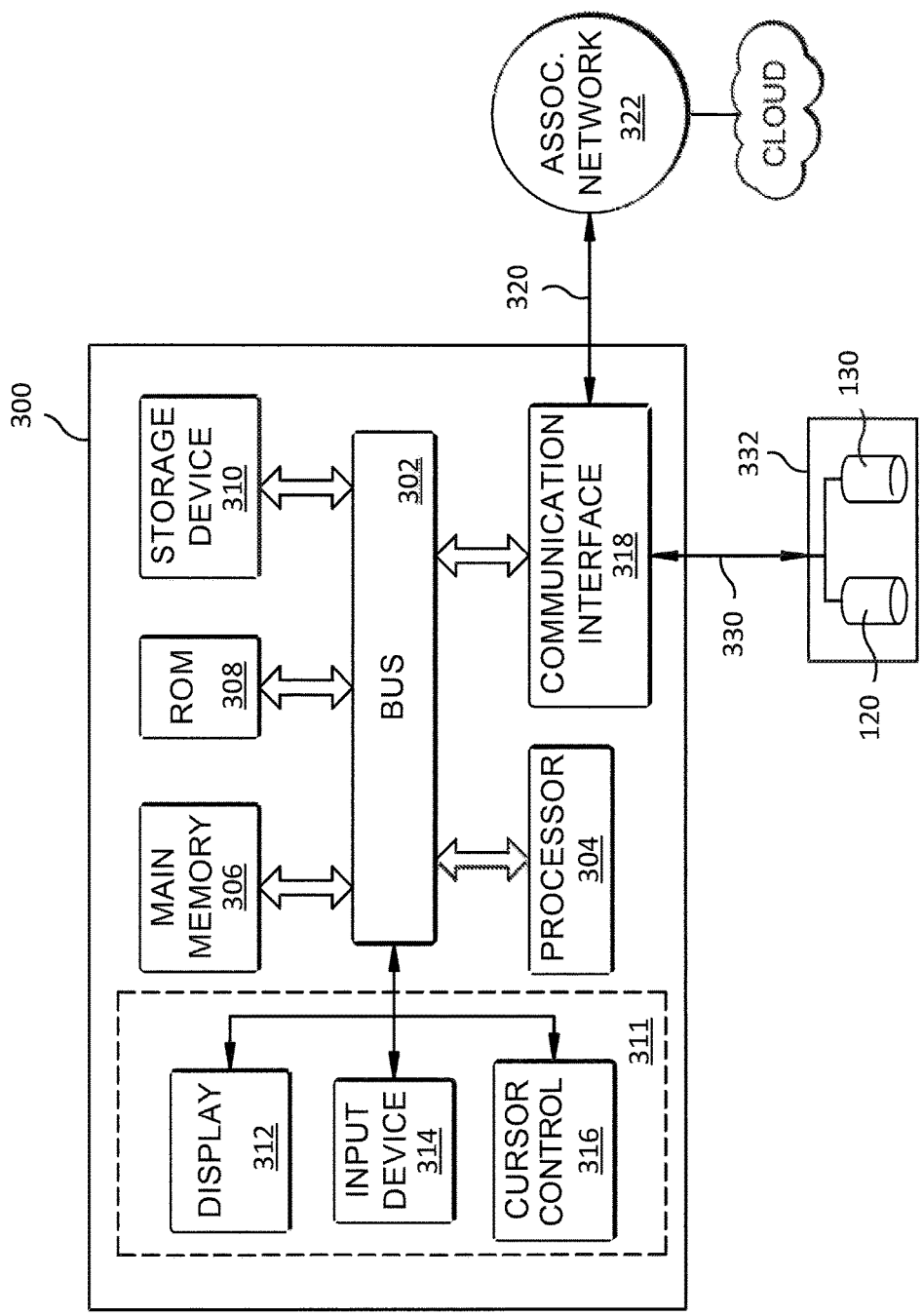
FIG. 3 is a block diagram that illustrates a computer system suitable for executing the example embodiments herein, and upon which the example embodiments may be implemented.

FIG. 3 illustrates an example of a computer system 300 upon which an example embodiment may be implemented. Computer system 300 is suitable for implementing the functionality of any of the surround view camera system 100 described herein.

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, SD memory and/or flash storage, is provided and coupled to bus 302 for storing information and instructions.

Computer system 300 may be coupled via bus 302 to a user interface 311. The user interface 311 may comprise a display 312, such as a cathode ray tube (CRT) or liquid crystal display (LCD), for displaying information to a user of the vehicles described above in connection with the example embodiments. The user interface 311 may further comprise, as necessary or desired, an input device 314, such as a keyboard including alphanumeric and other keys is coupled to bus 302 for communicating information and command selections to processor 304. Another type of user input device is cursor control 316, such as a mouse, a trackball, cursor direction keys, and/or a touchscreen for communicating direction information and command selections to processor 304 and for controlling cursor movement on display 312. This input device typically has two degrees of freedom in two axes, a first axis (e.g., x) and a second axis (e.g., y) that allows the device to specify positions in a plane. The input device 314 may be provided, for example, to enable technicians to perform various servicing on the computer system 300 such as to perform software or firmware updates, to download data, or the like. In these embodiments, the input device 314 may be unavailable to the user or simply disabled for access and/or use by the vehicle operator.

An aspect of the example embodiment is related to the use of computer system 300 to implement the vehicle surround view camera systems of the example embodiments herein to provide filling-in of blind spot regions in areas surrounding a vehicle such as a cargo truck, and to provide a system and methods for calibrating and using such surround view camera systems. According to an example embodiment, the steps of the filling-in of the blind spot regions of areas surround an item such as a vehicle, truck, or the like are provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

According to an example embodiment, a non-transitory computer readable storage medium 306, 308, 310 stores one or more sequences of instructions for filling in a blind spot region in a peripheral area of an associated vehicle, wherein said instructions, when executed by one or more processors 304 of the computer system 300, cause the one or more processors 304 to execute steps. The steps include, for example, storing intrinsic blind spot data representative of a blind spot region of a peripheral area of the associated vehicle in a non-transient memory operatively coupled with a processor of the associated imaging system, and storing movement data representative of a speed of movement of the associated vehicle in the non-transient memory. The steps further include obtaining, at a first time, first image data using an image obtaining unit operatively coupled with the processor of the associated imaging system, the first image data being representative of a first image of the peripheral area of the associated vehicle at the first time, and obtaining, at a second time after the first time, second image data using the image obtaining unit, the second image data being representative of a second image of the peripheral area of the associated vehicle at a second time after the first time. The steps also include determining, at the first time by a predicted blind spot region determining unit operatively coupled with the processor of the associated imaging system, a portion of the first image predicted to be in the blind spot region at the second time in accordance with the intrinsic blind spot data and the movement data. The steps of the example embodiment yet still further include generating, at the second time by a current blind spot region restoration unit operatively coupled with the processor of the associated imaging system, restored second image data by merging: i) a selected portion of the first image data corresponding to the portion of the first image predicted to be in the blind spot region at the second time, with ii) the second image data, wherein the generated restored second image data is representative of a restored second image of the peripheral area of the associated vehicle at the second time unobstructed by the blind spot region.

According to another example embodiment, a non-transitory computer readable storage medium 306, 308, 310 stores one or more sequences of instructions for filling in a blind spot region in a peripheral area of an associated vehicle, wherein said instructions, when executed by one or more processors 304 of the computer system 300, cause the one or more processors 304 to execute steps. The steps include, for example, storing intrinsic blind spot data representative of a blind spot region of a peripheral area of the associated vehicle in a non-transient memory operatively coupled with a processor of the associated imaging system. The steps further include obtaining, at a first time, first image data using an image obtaining unit operatively coupled with the processor of the associated imaging system, the first image data being representative of a first image of the peripheral area of the associated vehicle captured at a first time, and obtaining, at the first time, auxiliary image data using the image obtaining unit operatively coupled with the processor of the associated imaging system, the auxiliary image data being representative of an auxiliary image of the peripheral area of the associated vehicle captured at the first time. The steps still further include determining, by a blind spot overlap region determining unit operatively coupled with the processor and in accordance with the intrinsic blind spot data: a first portion of the first image in the blind spot region at the first time; and a first portion of the auxiliary image overlapping the first portion of the first image in the blind spot region at the first time. Yet further, the steps include generating, by a current blind spot region restoration unit operatively coupled with the processor, restored first image data by merging: i) a first portion of the auxiliary image data corresponding to the first portion of the auxiliary image overlapping the first portion of the first image in the blind spot region at the first time, with ii) the first image data at a first portion of the first image data corresponding to the first portion of the first image in the blind spot region at the first time, wherein the generated restored first image data is representative of a restored first image of the peripheral area of the associated vehicle at the first time unobstructed by the blind spot region.

The term "computer-readable medium" as used herein refers to any medium that participates in providing instructions to processor 304 for execution. Such a medium may take many forms, including but not limited to non-volatile media, and volatile media. Non-volatile media include, for example, optical or magnetic disks, such as storage device 310. Volatile media include dynamic memory, such as main memory 306. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling computer system 300 to a VPN link 320 that is connected to an Enterprise (or other predefined network 322. In an example embodiment, VPN link 320 is a wireless link. The communication interface 318 also provides a two-way data communication coupling the computer system 300 with a video link 330 that is connected with a camera set 332 including one (1), two (2), or more cameras. In the example embodiments herein, the one (1) or two (2) cameras include for example cameras 120 and 130.

Figure 4:
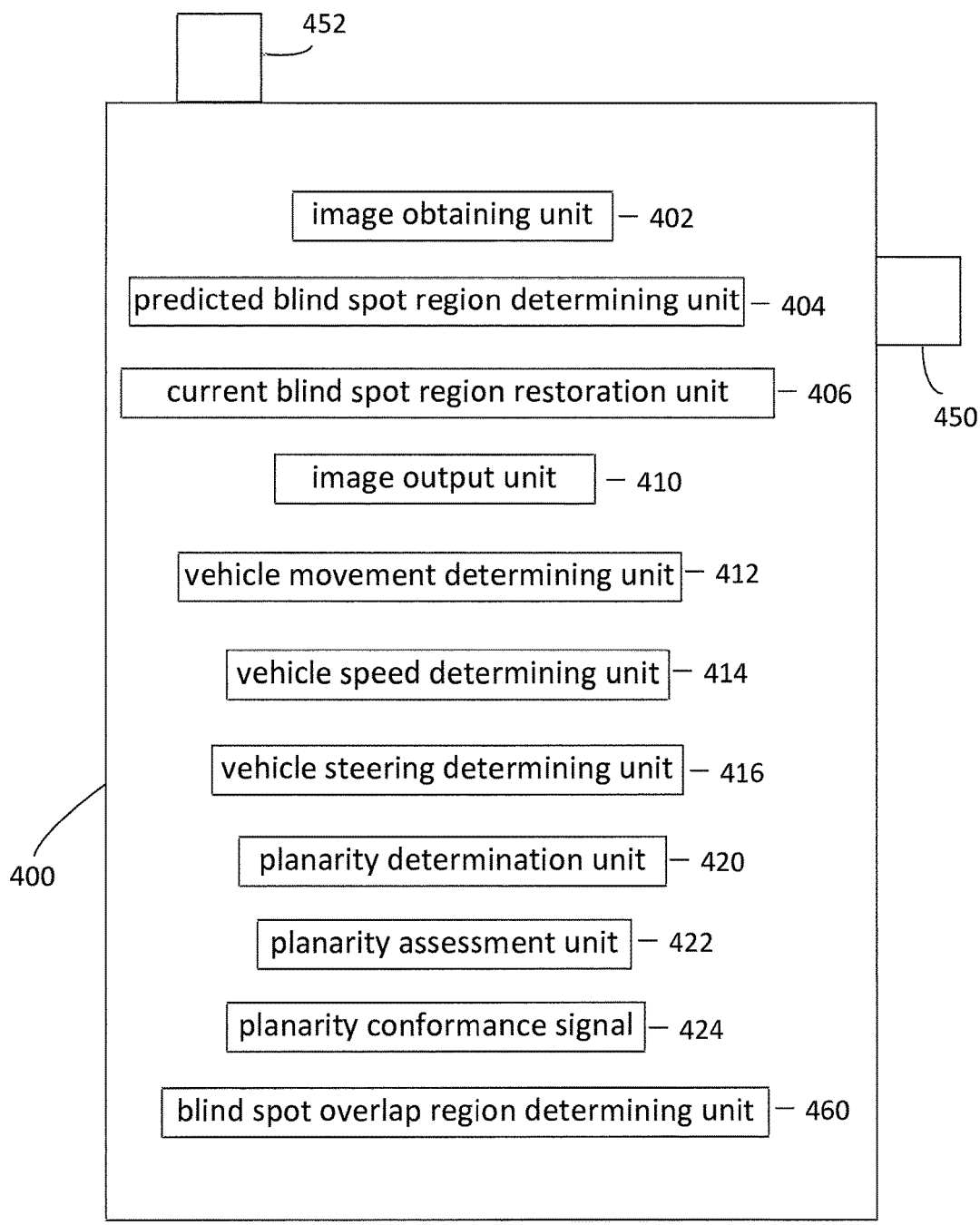
FIG. 4 is a block diagram of a set of code modules stored in a memory of the computer system of FIG. 3 and executable by a processor of the computer system for filling in blind spot regions in images of peripheral areas of a vehicle according to example embodiments.

FIG. 4 is a block diagram of a processing module set 400 including a plurality of modules for providing unobstructed images from the surround view camera systems by selectively filling in portions of the images in accordance with the embodiments herein. Each of the modules is executable by the processor 304 described above in connection with FIG. 3. In accordance with an embodiment, one or more or all of the modules or units 402-460 described below in connection with the processing module set 400 may comprise hardware in the form of the computer system 300 described above in connection with FIG. 3. For simplicity, scalability, and adaptability for change such as to implement upgrades or the like, in accordance with the example embodiments, the processor 304 of the surround view camera system is configured to execute software code in the form of one or more software modules or functional units including an image obtaining unit 402 operatively coupled with the processor. The image obtaining unit 402 is configured to receive first image data representative of a first image of the peripheral area of the associated vehicle captured at a first time, and to receive second image data representative of a second image of the peripheral area of the associated vehicle captured at a second time after the first time. A predicted blind spot region determining unit 404 is operatively coupled with the processor and is configured to determine, at the first time, a portion of the first image predicted to be in the blind spot region at the second time in accordance with the intrinsic blind spot data and the movement data. A current blind spot region restoration unit 406 is operatively coupled with the processor and is to generate, at the second time, restored second image data by merging: i) a selected portion of the first image data corresponding to the portion of the first image predicted to be in the blind spot region at the second time, with ii) the second image data. In that way and in accordance with the example embodiment, the generated restored second image data is representative of a restored second image of the peripheral area of the associated vehicle at the second time unobstructed by the blind spot region.

In the example embodiment, an image output unit 410 is operatively coupled with the processor and is configured to generate a visual representation of the restored second image on an associated human readable display device 312 in accordance with the generated restored second image data.

In addition, for purposes of determining the relative movement between the vehicle and the imaging system, the processing module set 400 further includes, in accordance with an embodiment, a vehicle movement determining unit 412 operatively coupled with the processor 304. The vehicle movement determining unit 412 is configured to generate the movement data in accordance with the vehicle speed and vehicle steering angle signals. In a particular embodiment, the vehicle movement determining unit 412 includes a vehicle speed determining unit 414 receiving a vehicle speed signal representative of a speed of the associated vehicle, and a vehicle steering determining unit 416 receiving a vehicle steering angle signal representative of a steering angle of the associated vehicle. The vehicle speed determining unit 414 may be, in an embodiment, a speed sensor generating the vehicle speed signal representative of the speed of the associated vehicle, and the vehicle steering determining unit 416 may be a steering angle sensor generating the vehicle steering angle signal representative of a steering angle of the associated vehicle. Additional sensors, such as yaw rate sensors or vehicle body angle sensors, may also provide input.

With continued reference to FIG. 4, the processing module set 400 further includes, in accordance with an embodiment, planarity determination and assessment units 420, 422. The planarity determination unit 420 is operatively coupled with the processor 304 and is configured to determine, in accordance with a planarity determination model, such as will be described below, a first planarity measure of the first portion of the first image predicted to be in the blind spot region at the second time, and a second planarity measure of the second image data. The planarity determination unit 420 operates on the in accordance essentially with the set of predictive, homography, and contrast measure equations. In addition, the planarity determination and assessment units 420, 422 are operable cooperatively in the example embodiment. In this regard, the planarity assessment unit 422 is operatively coupled with the processor 304 and configured to determine a planarity conformance level of the first and second planarity measures relative to a predetermined planarity metric, and to selectively generate a planarity conformance signal 424 in accordance with the determined planarity conformance level. It is to be appreciated that, in accordance with the example embodiment, the planarity determination unit 420 is configured to determine the first and second planarity measures in accordance with a planarity assessment algorithm. It is further to be appreciated that, in accordance with the example embodiment, the current blind spot region restoration unit 406 is configured to selectively merge default blank image data representative of a predetermined neutral image with the second image data in accordance with a logical level of the planarity conformance signal.

In an embodiment the image obtaining unit 402 includes one or more cameras 450, 452 configured to capture image data as a sequence of image data frame sets, wherein each image data frame set of the frame sets being acquired in succession following a predetermined time interval. In the example embodiment, a time between the first time and the second time is an integer multiple of the predetermined frame time interval. In particular, in the example embodiment including a single or only one (1) camera, the camera 450 of the image obtaining unit 402 is configured to capture, at a first time from a first perspective relative to the associated vehicle, the first image data representative of the first image of the peripheral area of the associated vehicle, and to capture at a second time from the same first perspective relative to the vehicle, the second image data representative of the second image of the peripheral area of the associated vehicle at the second time. In this embodiment, a Class II Similarity transformation model is used. Similarity transformation (or more simply a similarity) is an isometry composed with tropic scaling. In the case of a Euclidean transformation composed with a scaling reflection) the similarity has matrix representation:

$$\begin{pmatrix} x' \\ y' \\ 1 \end{pmatrix} = \begin{bmatrix} s\cos\theta & -s\sin\theta & t_x \\ s\sin\theta & s\cos\theta & t_y \\ 0 & 0 & 1 \end{bmatrix} \begin{pmatrix} x \\ y \\ 1 \end{pmatrix}$$

Can be written more concisely in block form as:

$$x' = H_s x = \begin{bmatrix} sR & t \\ 0^\top & 1 \end{bmatrix} x$$

The scaler s represents the isotropic scaling. A similarity transformation is also shown as an equi-form transformation, because it preserves "shape" (form). A planar similarity transformation has four degrees of freedom, the scaling accounting for one degree of freedom than a Euclidean transformation. A similarity can be computed two point correspondences.

The similarity transformation model is used in the single camera embodiment to predict the location x', y' of portions of an image at a time in the future based on the location x, y of those portions of an image at a present time using an angle of vehicle movement θ and a translation movement of the vehicle in first x and second y directions in first $t_x$ and second $t_y$ amounts of movement. In the elapsed time between frames, the ground moves a distance equal to the vehicle speed times the elapsed time. The vehicle changes direction by an angle equal to the yaw rate (which may be measured) times the elapsed time. These values—the distance and rotation—are inputs to the image prediction equation, where they are the translation and rotation values respectively.

In the embodiments herein including two (2) image obtaining units such as a pair of cameras for example, the first camera 450 of the image obtaining unit 402 is configured to capture, at a first time from a first perspective relative to the associated vehicle, the first image data representative of the first image of the peripheral area of the associated vehicle. Correspondingly the second camera 452 is configured to capture, at the same first time, from a second perspective relative to the associated vehicle different than the first perspective, auxiliary image data representative of an auxiliary image of the peripheral area of the associated vehicle.

In the example embodiment including two (2) cameras, the auxiliary image data representative of an auxiliary image of the peripheral area of the associated vehicle provides valuable information for providing unobstructed images from the surround view camera systems by selectively filling in portions of the images. In this regard, however, the processing module set 400 further includes a blind spot overlap region determining unit 460 operatively coupled with the processor 304.

Use of homography matrix techniques is advantageous in mapping or otherwise performing view point conversion between the auxiliary image data representative of the auxiliary image of the peripheral area of the associated vehicle as obtained by the second camera into a selected portion of the first image data representative of the first image of the peripheral area of the associated vehicle obtained by the first camera. In addition, perspective skew removal is accomplished in accordance with the example embodiment using homography techniques. The embodiments may selectively perform a calibration process for determining the homography matrix parameters for each camera 450, 452 in the two (2) camera embodiment, wherein the homography matrix H determined separately for each camera provides the least skew error in the resultant image from the respective camera and, ultimately, the least amount of skew between camera pairs in the composite resultant image to be displayed to the operator on the display device 312 such as will be described in greater detail below.

An initial or a "default" homography matrix for each active camera is obtained after calibration. In the two (2) camera embodiments herein, the homography matrix is used for converting an original image to a converted image by the planar projective transformation. In particular, planar projective transformation is used to map or otherwise perform view point conversion between the auxiliary image data representative of the auxiliary image of the peripheral area of the associated vehicle as obtained by the second camera into a selected portion of the first image data representative of the first image of the peripheral area of the associated vehicle obtained by the first camera. Coordinates at each point on the original image are represented by (x, y) and coordinates of each point on the converted image are represented by (X, Y). The relation between the coordinates (x, y) on the original image and the coordinates (X, Y) on the converted image is expressed by the first of the formulas below using a homography matrix H. The homography matrix H is a 3×3 matrix and each of the elements of the matrix is expressed by $h_1$ to $h_9$. Moreover, $h_9=1$ (the matrix is normalized such that $h_9=1$). From the formula, the relation between the coordinates (x, y) and the coordinates (X, Y) also can be expressed by the following formulas.

$$\begin{pmatrix} X \\ Y \\ 1 \end{pmatrix} = H \begin{pmatrix} x \\ y \\ 1 \end{pmatrix}$$

$$= \begin{pmatrix} h_1 & h_2 & h_3 \\ h_4 & h_5 & h_6 \\ h_7 & h_8 & h_9 \end{pmatrix} \begin{pmatrix} x \\ y \\ 1 \end{pmatrix}$$

$$= \begin{pmatrix} h_1 & h_2 & h_3 \\ h_4 & h_5 & h_6 \\ h_7 & h_8 & 1 \end{pmatrix} \begin{pmatrix} x \\ y \\ 1 \end{pmatrix}$$

$$X = \frac{h_1 x + h_2 y + h_3}{h_7 x + h_8 y + h_9}$$

$$Y = \frac{h_4 x + h_5 y + h_6}{h_7 x + h_8 y + h_9}$$

The homography matrix H is uniquely determined if corresponding relations of the coordinates of four points between the original image and the converted image are known. Once the homography matrix H is obtained, it becomes possible to convert a given point on the original image to a point on the converted image according to the above formulas. In the example embodiments herein an initial or nominal homography matrix H is received and stored in the memory 310 for later use and/or further improvement by one or more subsequent calibration steps or the like.

With regard to obtaining the initial homography matrix, error values are obtained or otherwise derived related to the homography related error values. In accordance with an example embodiment, a numerical optimization function is performed to find homography matrix values that make the total registration error smaller. In one embodiment, the numerical optimization step includes a Simplex Method to improve the fidelity between the obtained image and square or rectangular templates. During the calculations, the homography matrix values are adjusted in accordance with the result obtained during the numerical optimization. Next, the raw image data is un-skewed with or using the improved homography matrix values. This image is then in turn once again tested against a known regular square or rectangular grid image to determine improved homography related calibration parameter values.

In the two (2) camera embodiments herein, an undistorted and filled-in bird's eye view is generated using the determined homography matrix and optimized lens distortion characteristic parameters wherein areas otherwise blocked by mirrors or other vehicle parts are seamlessly presented to the vehicle operator.

In a first example embodiment of the system having two (2) cameras, the blind spot overlap region determining unit 460 is configured to determine, at the first time in accordance with the intrinsic blind spot data and the movement data a first portion of the first image in the blind spot region at the first time, and a first portion of the auxiliary image overlapping the first portion of the first image in the blind spot region at the first time. Thereafter, the current blind spot region restoration unit 406 is operable to generate restored first image data by merging: i) a first portion of the auxiliary image data corresponding to the first portion of the auxiliary image overlapping the first portion of the first image in the blind spot region at the first time, with ii) the first image data at a first portion of the first image data corresponding to the first portion of the first image in the blind spot region at the first time. In accordance with this embodiment, the intrinsic blind spot data is used but there is no need for the movement data because the images, particularly the overlapping regions of the images, are acquired or otherwise obtained substantially simultaneously. In any case, the thereby generated restored first image data is representative of a restored first image of the peripheral area of the associated vehicle at the first time unobstructed by the blind spot region.

In a second example embodiment of the system having two (2) cameras, the blind spot overlap region determining unit 460 is configured to determine, in accordance with the intrinsic blind spot data and the movement data, a first portion of the auxiliary image overlapping the portion of the first image predicted to be in the blind spot region at the second time. Thereafter, the current blind spot region restoration unit 406 is operable to generate the restored second image data by merging: i) a first portion of the auxiliary image data corresponding to the first portion of the auxiliary image overlapping the portion of the first image predicted to be in the blind spot region at the second time, with ii) the second image data at a first portion of the second image data corresponding to the first portion of the second image in the blind spot in accordance with the intrinsic blind spot data and the movement data. The thereby generated restored second image data is representative of a restored second image of the peripheral area of the associated vehicle at the second time unobstructed by the blind spot region.

FIGS. 5a-5d illustrate a process of registration of a pair of adjacent images showing a joining at the seam between the images. The Figures illustrate an uncompensated example of a composite image 500 formed of a pair of images 552, 554 obtained for example by adjacent cameras 120, 130 or by a single camera 120 for purposes of stitching portions of an image into another image. As can be seen, the images are well represented, but the overlap therebetween is maladjusted at a seam 556.

A method for merging the images 552, 556 includes a step of extracting edges from the images and determines edge thresholds for the first camera of the $n^{th}$ camera pair and, similarly, the method includes extracting edges and performing thresholds analysis and/or comparisons relative to the second camera of the $n^{th}$ camera pair. The first edge threshold can be determined by standard methods, such as finding a histogram minimum or Otsu's method. More particularly, edges are extracted in the image of the first image of the $n^{th}$ camera pair, and an edge threshold is determined in the image. Correspondingly, edges are extracted in the image of the second camera of the $n^{th}$ camera pair and, at a next step, edge thresholds are obtained in the image of the second camera of the $n^{th}$ camera pair. In accordance with the example embodiments, the edge threshold for the second image is chosen such that as many or slightly more edge pixels are found in the registration area. This slight possible surfeit of edge pixels implies that all the edge pixels of the first image should have matching counterparts when properly registered. That is, the second set of edge pixels should be a superset of the first edge pixel set. A measure that quantifies the number of edge pixels of the first image are matched is therefore appropriate used in the example embodiments. Thereafter, the error of the camera pair or image mal-registration is determined using techniques, such as, for example, the percentage of pixels overlapping at the same locations, Haussdorf distance, Jacard distance, or similar measures for distances between point sets.

Figure 5A:
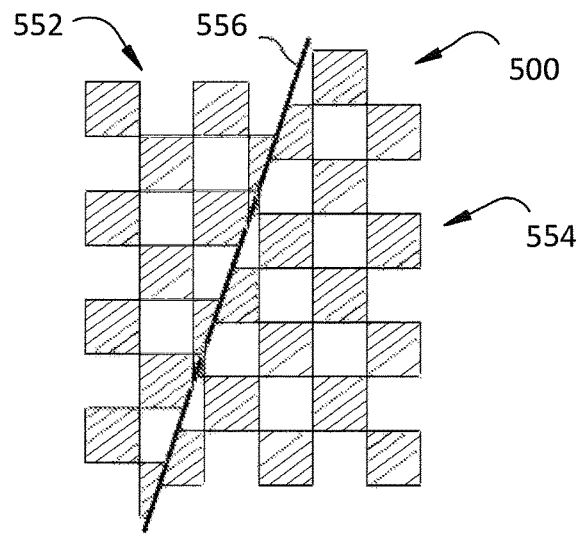
FIGS. 5a-5d illustrate a process of registration of a pair of adjacent images showing a joining at the seams between the images to merge or otherwise paste images together in accordance with an embodiment.
Figure 5B:
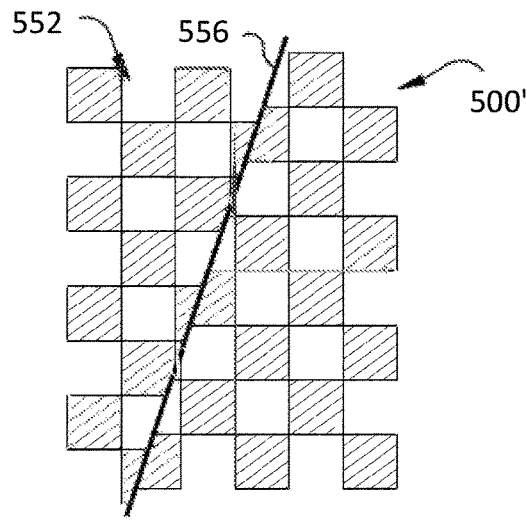
Figure 5C:
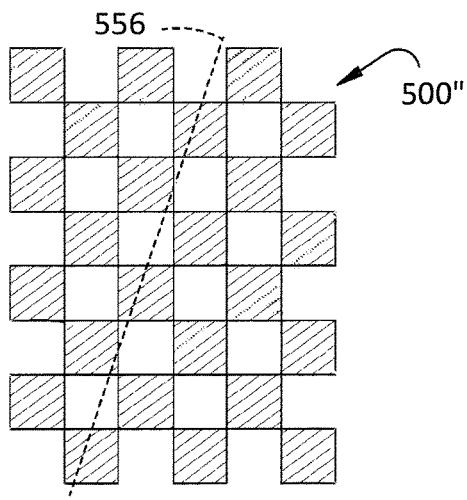

FIG. 5b illustrates an example of a composite image 500' formed by the pair of images 552, 554 and compensated by executing the compensation on the initial composite image 500 once. Similarly, FIG. 5c illustrates an example of a composite image 500" formed by the pair of images 552, 554 and compensated by executing the compensation on the composite image 500' once further. As can be seen, the images are well represented, and the seam 556 at the overlap area is visually non-existent. The registration area is advantageously chosen such that it covers both sides of a possible seam or image stitching location.

Figure 5D:
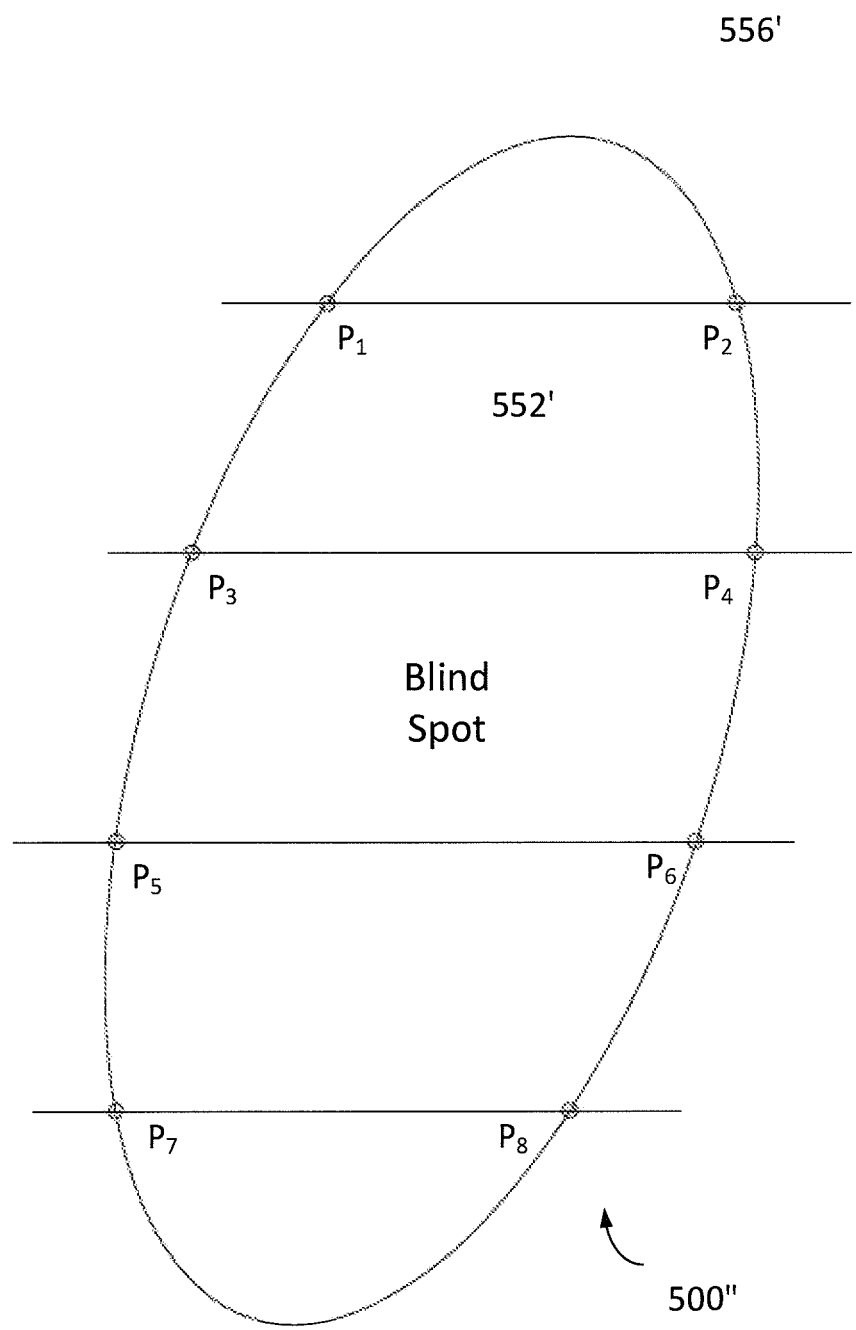

FIG. 5d illustrates an example of a composite image 500" formed by the pair of images 552', 556' method for merging the images 552', 556' includes a step of extracting image contrast edges at points $P_1$-$P_8$ from the images and determines edge contrast thresholds for the first camera of the nth camera pair and, similarly, the method includes extracting edges and performing thresholds analysis and/or comparisons relative to the second camera of the nth camera pair.

In accordance with the example embodiment, a quantity Match Measure is calculated to determine registration quality or match between a patch and its surroundings. The Match Measure is determined and compared against a predetermined maximum value to determine an amount one or both of the images 552', 556' should be adjusted in contrast, wherein:

Match measure =

$$\sum_{i=1}^{8} |Pi| = \text{sum of absolute value of differences at } P_1 \ldots P_8$$

If all differences indicate an, on average, lighter or darker patch compared with the surroundings, the average difference is added to all pixels in the patch area. This addition makes the patch boundaries meld more seamlessly with its surroundings.

Figure 6:
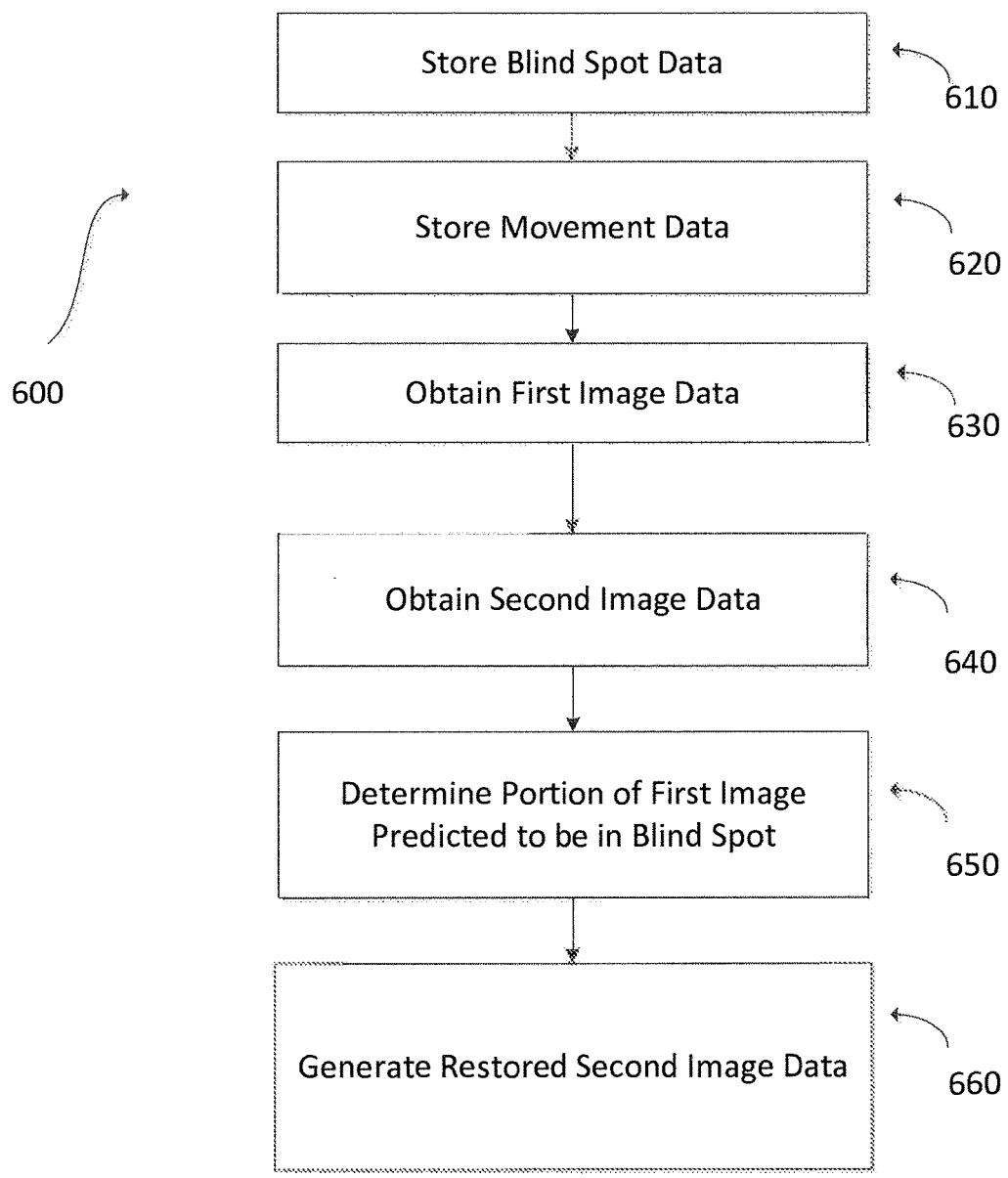
FIG. 6 is a flow chart illustrating an overall method of filling in blind spot regions in images of peripheral areas of a vehicle in accordance with an example embodiment.

In view of the foregoing structural and functional features described above, a methodology 600 in accordance with an example embodiment will be better appreciated with reference to FIG. 6. While, for purposes of simplicity of explanation, the methodology 600 of FIG. 6 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement the methodology 600 in accordance with the example embodiments. The methodology 600 described herein is suitably adapted to be implemented in hardware, software, and/or any one or more combination(s) thereof. For example, the methodology 600 may be implemented by logic and/or by computer system 300 (FIG. 3) using the functional units 402-460 of the processing module set 400 of FIG. 4 and in any or all of the surround view camera systems 100 such as the system described above.

In general, surround views systems give a vehicle driver a display of the environment around a vehicle. Multiple cameras are used to produce this view, first with adjacent images having overlapping regions being "stitched" together, then with the overall registration of the composite image being optimized. In accordance with the example embodiments herein and for best view quality and obstacle detection performance, the systems and methods herein provide enhanced filling in of blind spot regions in images of peripheral areas of a vehicle including one, two or more cameras disposed on the vehicle and coupled with the surround view camera system described above.

With reference now to FIG. 6, a method 600 in an associated imaging system for filling in a blind spot region in a peripheral area of an associated vehicle is illustrated.

In a first step 610, intrinsic blind spot data representative of a blind spot region of a peripheral area of the associated vehicle is stored in a non-transient memory operatively coupled with a processor of the associated imaging system.

At step 620, movement data representative of a speed of movement of the associated vehicle is stored in the non-transient memory.

The method further includes obtaining, at a first time in step 630, first image data using an image obtaining unit operatively coupled with the processor of the associated imaging system. The first image data is representative of a first image of the peripheral area of the associated vehicle at the first time.

The method further includes obtaining, in step 640 at a second time after the first time, second image data using the image obtaining unit. The second image data is representative of a second image of the peripheral area of the associated vehicle at a second time after the first time.

At step 650, using a predicted blind spot region determining unit at the first time, a portion of the first image predicted to be in the blind spot region at the second time is determined in accordance with the intrinsic blind spot data and the movement data.

Restored second image data is generated at step 660 at the second time by a current blind spot region restoration unit operatively coupled with the processor of the associated imaging system. In accordance with the embodiment illustrated, the restored second image data is generated by merging: i) a selected portion of the first image data corresponding to the portion of the first image predicted to be in the blind spot region at the second time, with ii) the second image data. In the embodiment, the generated restored second image data is representative of a restored second image of the peripheral area of the associated vehicle at the second time unobstructed by the blind spot region.

Figure 7:
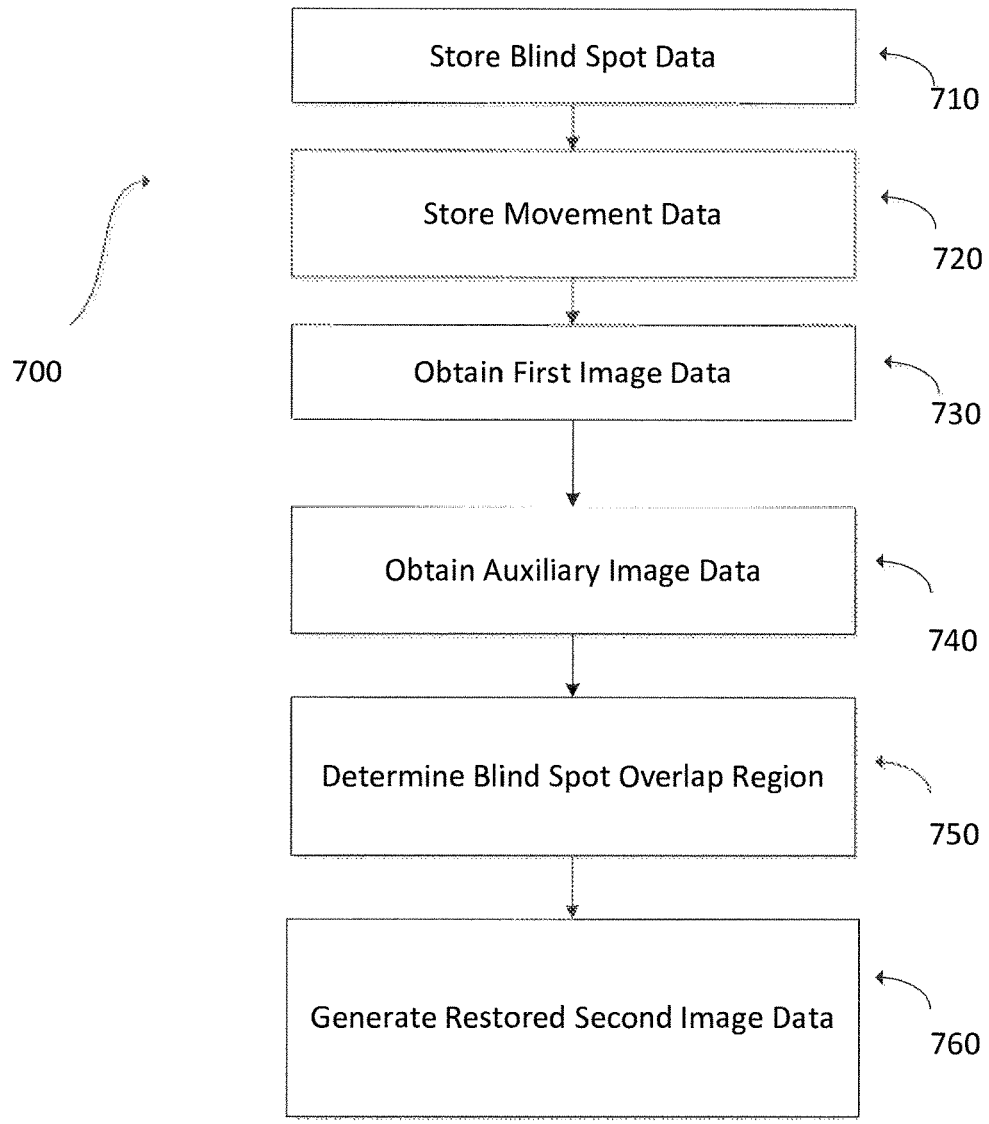
FIG. 7 is a flow chart illustrating an overall method of filling in blind spot regions in images of peripheral areas of a vehicle in accordance with a further example embodiment.

In further view of the foregoing structural and functional features described above, a further methodology 700 in accordance with an example embodiment will be better appreciated with reference to FIG. 7. While, for purposes of simplicity of explanation, the methodology 700 of FIG. 7 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement the methodology 700 in accordance with the example embodiments. The methodology 700 described herein is suitably adapted to be implemented in hardware, software, and/or any one or more combination(s) thereof. For example, the methodology 700 600 may be implemented by logic and/or by computer system 300 (FIG. 3) using the functional units 402-460 of the processing module set 400 of FIG. 4 and in any or all of the surround view camera systems 100 such as the system described above.

In general, surround views systems give a vehicle driver a display of the environment around a vehicle. Multiple cameras are used to produce this view, first with adjacent images having overlapping regions being "stitched" together, then with the overall registration of the composite image being optimized. In accordance with the example embodiments herein and for best view quality and obstacle detection performance, the systems and methods herein provide enhanced filling in of blind spot regions in images of peripheral areas of a vehicle including one, two or more cameras disposed on the vehicle and coupled with the surround view camera system described above.

With reference now to FIG. 7, a method 700 in an associated imaging system for filling in a blind spot region in a peripheral area of an associated vehicle is illustrated.

In a first step 710, intrinsic blind spot data representative of a blind spot region of a peripheral area of the associated vehicle is stored in a non-transient memory operatively coupled with a processor of the associated imaging system.

At step 720, movement data representative of a speed of movement of the associated vehicle is stored in the non-transient memory.

The method further includes obtaining, at 730, at a first time, first image data using an image obtaining unit operatively coupled with the processor of the associated imaging system. In the illustrated embodiment, the first image data is representative of a first image of the peripheral area of the associated vehicle captured at a first time.

At step 740, at the first time, auxiliary image data is obtained using the image obtaining unit operatively coupled with the processor of the associated imaging system. The auxiliary image data is representative of an auxiliary image of the peripheral area of the associated vehicle captured at the first time.

The method further includes, at step 750, determining, by a blind spot overlap region determining unit operatively coupled with the processor and in accordance with the intrinsic blind spot data and, selectively, the movement data: a first portion of the first image in the blind spot region at the first time; and a first portion of the auxiliary image overlapping the first portion of the first image in the blind spot region at the first time. In the examples described above, the movement data is useful in the embodiment described with reference to FIG. 2c for making the blind spot prediction, but the movement data is somewhat not useful in the embodiment described with reference to FIG. 2b wherein the images are obtained simultaneously, including the overlap area and the blind spot area.

Yet still further, the method 700 includes, at step 760, generating, by a current blind spot region restoration unit operatively coupled with the processor, restored first image data by merging: i) a first portion of the auxiliary image data corresponding to the first portion of the auxiliary image overlapping the first portion of the first image in the blind spot at the first time, with ii) the first image data at a first portion of the first image data corresponding to the first portion of the first image in the blind spot at the first time. In the embodiment the generated restored first image data is representative of a restored first image of the peripheral area of the associated vehicle at the first time unobstructed by the blind spot region.

Figure 8A:
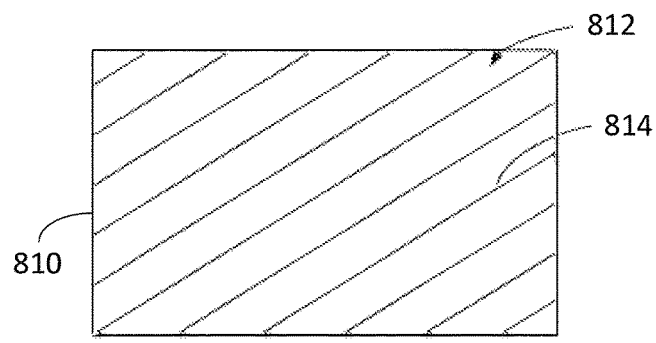
FIGS. 8a-8d show simple illustrative example images selectively generated by the embodiments herein.

FIG. 8a shows an image 810 of an area 812 adjacent to a vehicle in accordance with an embodiment. The area 812 has a pattern 814 illustrated as a simply cross-hatch for ease of discussion. The image 810 illustrated is a complete image without any obstructions and/or blind spots.

Figure 8B:
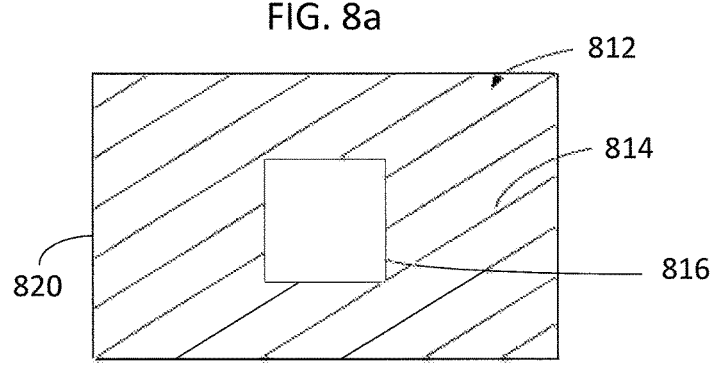

FIG. 8b shows an image 820 including an obstructed region 816 obstructing a portion of the image 810 of FIG. 8a.

Figure 8C:
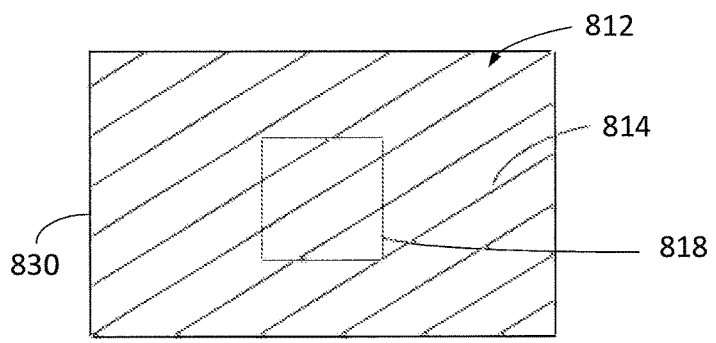

FIG. 8c shows a restored image 830 in accordance with embodiments herein wherein the image 820 of FIG. 8b including the obstructed region 816 obstructing the portion of the image 810 of FIG. 8a, has been remediated with the addition of a blind spot fill-in portion 818. As can be seen, the blind spot fill-in portion 818 is stitched into the image 820 of FIG. 8b seamlessly.

Figure 8D:
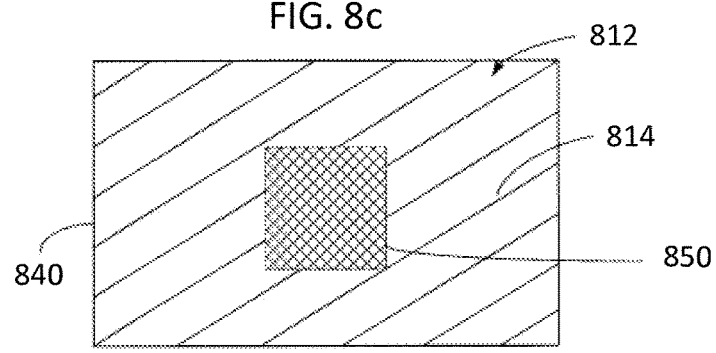

FIG. 8d shows an unrestored image 840 in accordance with embodiments herein wherein the image 820 of FIG. 8b including the obstructed region 816 obstructing the portion of the image 810 of FIG. 8a, cannot reasonably be remediated with the addition of the blind spot fill-in portion 818. Rather, as can be seen, the blind spot fill-in portion 818 of FIG. 8c is instead replaced with a darkened or greyed out region 850 which is useful the vehicle operator in that the operator is not presented with poor quality restored images which might cause confusion or the like.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

Having thus described the example embodiments, it is now claimed:

1. An imaging system filling in blind spot regions in peripheral areas of an associated vehicle, the system comprising:
   a processor;
   a non-transient memory operatively coupled with the processor, the non-transient memory storing intrinsic blind spot data representative of a blind spot region of a peripheral area of the associated vehicle, and movement data representative of a speed of movement of the associated vehicle;
   an image obtaining unit operatively coupled with the processor, the image obtaining unit being configured to receive first image data representative of a first image of the peripheral area of the associated vehicle captured at a first time, and to receive second image data representative of a second image of the peripheral area of the associated vehicle captured at a second time after the first time;
   a predicted blind spot region determining unit operatively coupled with the processor, the predicted blind spot region determining unit being configured to determine, at the first time, a portion of the first image predicted to be in the blind spot region at the second time in accordance with the intrinsic blind spot data and the movement data; and
   a current blind spot region restoration unit operatively coupled with the processor, the current blind spot region restoration unit being configured to generate, at the second time, restored second image data by merging: i) a selected portion of the first image data corresponding to the portion of the first image predicted to be in the blind spot region at the second time, with ii) the second image data, wherein the generated restored second image data is representative of a restored second image of the peripheral area of the associated vehicle at the second time unobstructed by the blind spot region.

2. The imaging system according to claim 1, further comprising:
   an image output unit operatively coupled with the processor and configured to generate a visual representation of the restored second image on an associated human readable display device in accordance with the generated restored second image data.

3. The imaging system according to claim 1, further comprising:
   a vehicle movement determining unit operatively coupled with the processor and comprising:
      a vehicle speed determining unit receiving a vehicle speed signal representative of a speed of the associated vehicle; and
      a vehicle steering determining unit receiving a vehicle steering angle signal representative of a steering angle of the associated vehicle,
   wherein the vehicle movement determining unit is configured to generate the movement data in accordance with the vehicle speed and vehicle steering angle signals.

4. The imaging system according to claim 1, further comprising:
   a planarity determination unit operatively coupled with the processor and configured to determine, in accordance with a planarity determination model:
      a first planarity measure of the first portion of the first image predicted to be in the blind spot region at the second time; and
      a second planarity measure of the second image data; and
   a planarity assessment unit operatively coupled with the processor and configured to:
      determine a planarity conformance level of the first and second planarity measures relative to a predetermined planarity metric; and
      selectively generate a planarity conformance signal in accordance with the determined planarity conformance level.

5. The imaging system according to claim 4, wherein:
   the planarity determination unit is configured to determine the first and second planarity measures in accordance with a planarity assessment algorithm; and
   the current blind spot region restoration unit is configured to selectively merge default blank image data representative of a predetermined neutral image with the second image data in accordance with a logical level of the planarity conformance signal.

6. The imaging system according to claim 1, wherein:
   the image obtaining unit comprises a camera configured to capture image data as a sequence of image data frame sets, each image data frame set of the frame sets being acquired in succession following a predetermined time interval; and
   a time between the first time and the second time is an integer multiple of the predetermined time interval.

7. The imaging system according to claim 1, wherein the image obtaining unit comprises:
   a first camera configured to: capture, at the first time, from a first perspective relative to the associated vehicle, the first image data representative of the first image of the peripheral area of the associated vehicle; and capture, at the second time, from the first perspective, the second image data representative of the second image of the peripheral area of the associated vehicle at the second time; and
   a second camera configured to capture, at the first time, from a second perspective relative to the associated vehicle different than the first perspective, auxiliary image data representative of an auxiliary image of the peripheral area of the associated vehicle.

8. The imaging system according to claim 7, further comprising:
a blind spot overlap region determining unit operatively coupled with the processor and configured to determine, at the first time in accordance with the intrinsic blind spot data and the movement data:
a first portion of the first image in the blind spot region at the first time; and
a first portion of the auxiliary image overlapping the first portion of the first image in the blind spot region at the first time,
wherein the current blind spot region restoration unit is configured to generate restored first image data by merging: i) a first portion of the auxiliary image data corresponding to the first portion of the auxiliary image overlapping the first portion of the first image in the blind spot region at the first time, with ii) the first image data at a first portion of the first image data corresponding to the first portion of the first image in the blind spot region at the first time, wherein the generated restored first image data is representative of a restored first image of the peripheral area of the associated vehicle at the first time unobstructed by the blind spot region.

9. The imaging system according to claim 7, further comprising:
a blind spot overlap region determining unit operatively coupled with the processor and configured to determine, in accordance with the intrinsic blind spot data and the movement data, a first portion of the auxiliary image overlapping the portion of the first image predicted to be in the blind spot region at the second time,
wherein the current blind spot region restoration unit is configured to generate the restored second image data by merging: i) a first portion of the auxiliary image data corresponding to the first portion of the auxiliary image overlapping the portion of the first image predicted to be in the blind spot region at the second time, with ii) the second image data at a first portion of the second image data corresponding to the first portion of the second image in the blind spot in accordance with the intrinsic blind spot data and the movement data, wherein the generated restored second image data is representative of a restored second image of the peripheral area of the associated vehicle at the second time unobstructed by the blind spot region.

10. An imaging system filling in blind spot regions in peripheral areas of an associated vehicle, the system comprising:
a processor;
a non-transient memory operatively coupled with the processor, the non-transient memory storing intrinsic blind spot data representative of a blind spot region of a peripheral area of the associated vehicle;
an image obtaining unit operatively coupled with the processor and configured to receive first image data representative of a first image of the peripheral area of the associated vehicle captured at a first time, and to receive auxiliary image data representative of an auxiliary image of the peripheral area of the associated vehicle captured at the first time;
a blind spot overlap region determining unit operatively coupled with the processor and configured to determine, at the first time in accordance with the intrinsic blind spot data:
a first portion of the first image in the blind spot region at the first time; and
a first portion of the auxiliary image overlapping the first portion of the first image in the blind spot region at the first time; and
a current blind spot region restoration unit operatively coupled with the processor and configured to generate restored first image data by merging: i) a first portion of the auxiliary image data corresponding to the first portion of the auxiliary image overlapping the first portion of the first image in the blind spot region at the first time, with ii) the first image data at a first portion of the first image data corresponding to the first portion of the first image in the blind spot region at the first time, wherein the generated restored first image data is representative of a restored first image of the peripheral area of the associated vehicle at the first time unobstructed by the blind spot region.

11. The imaging system according to claim 10, further comprising:
an image output unit operatively coupled with the processor and configured to generate a visual representation of the restored first image on an associated human readable display device in accordance with the generated restored first image data.

12. The imaging system according to claim 10, wherein the image obtaining unit comprises:
a first camera configured to capture, at the first time, from a first perspective relative to the associated vehicle, the first image data representative of the first image of the peripheral area of the associated vehicle; and
a second camera configured to capture, at the first time, from a second perspective relative to the associated vehicle different than the first perspective, the auxiliary image data representative of the auxiliary image of the peripheral area of the associated vehicle.

13. The imaging system according to claim 10, further comprising:
a planarity determination unit operatively coupled with the processor and configured to determine, in accordance with a planarity determination model, a planarity measure of the first portion of the auxiliary image data corresponding to the first portion of the auxiliary image overlapping the first portion of the first image in the blind spot region at the first time; and
a planarity assessment unit operatively coupled with the processor and configured to:
determine a planarity conformance level of the planarity measure relative to a predetermined planarity metric; and
selectively generate a planarity conformance signal in accordance with the determined planarity conformance level.

14. The imaging system according to claim 13, wherein:
the planarity determination unit is configured to determine the planarity measure in accordance with a planarity assessment algorithm; and
the current blind spot region restoration unit is configured to selectively merge default blank image data representative of a predetermined neutral image with the first image data at a first portion of the first image data corresponding to the first portion of the first image in the blind spot region at the first time in accordance with a logical level of the planarity conformance signal.

15. A method in an associated imaging system for filling in a blind spot region in a peripheral area of an associated vehicle, the method comprising:
storing intrinsic blind spot data representative of a blind spot region of a peripheral area of the associated vehicle in a non-transient memory operatively coupled with a processor of the associated imaging system;

storing movement data representative of a speed of movement of the associated vehicle in the non-transient memory;

obtaining, at a first time, first image data using an image obtaining unit operatively coupled with the processor of the associated imaging system, the first image data being representative of a first image of the peripheral area of the associated vehicle at the first time;

obtaining, at a second time after the first time, second image data using the image obtaining unit, the second image data being representative of a second image of the peripheral area of the associated vehicle at a second time after the first time;

determining, at the first time by a predicted blind spot region determining unit operatively coupled with the processor of the associated imaging system, a portion of the first image predicted to be in the blind spot region at the second time in accordance with the intrinsic blind spot data and the movement data; and generating, at the second time by a current blind spot region restoration unit operatively coupled with the processor of the associated imaging system, restored second image data by merging: i) a selected portion of the first image data corresponding to the portion of the first image predicted to be in the blind spot region at the second time, with ii) the second image data, wherein the generated restored second image data is representative of a restored second image of the peripheral area of the associated vehicle at the second time unobstructed by the blind spot region.

16. The method according to claim 15, further comprising:

generating, by an image output unit operatively coupled with the processor of the associated imaging system, a visual representation of the restored second image on an associated human readable display device in accordance with the generated restored second image data.

17. The method according to claim 15, further comprising:

receiving, by a vehicle speed determining unit of a vehicle movement determining unit operatively coupled with the processor of the associated imaging system, a vehicle speed signal representative of a speed of the associated vehicle;

receiving, by a vehicle steering determining unit of the vehicle movement determining unit, a vehicle steering angle signal representative of a steering angle of the associated vehicle; and generating, by the vehicle movement determining unit, the movement data in accordance with the vehicle speed and vehicle steering angle signals.

18. The method according to claim 15, further comprising:

determining, by a planarity determination unit operatively coupled with the processor, in accordance with a planarity determination model:

a first planarity measure of the first portion of the first image predicted to be in the blind spot region at the second time; and a second planarity measure of the second image data;

determining, by a planarity assessment unit operatively coupled with the processor, a planarity conformance level of the first and second planarity measures relative to a predetermined planarity metric; and selectively generating, by the planarity assessment unit, a planarity conformance signal in accordance with the determined planarity conformance level.

19. The method according to claim 18, wherein:

the determining the first and second planarity measures comprises determining, by the planarity determination unit, the first and second planarity measures in accordance with a planarity assessment algorithm; and the merging of the selected portion of the first image with the second image data by the current blind spot region restoration unit comprises selectively merging default blank image data representative of a predetermined neutral image with the second image data in accordance with a logical level of the planarity conformance signal.

20. The method according to claim 15, wherein:

the receiving the first and second image data comprises capturing the image data as a sequence of image data frame sets using a camera of the imaging unit configured to capture image data, each image data frame set of the frame sets being acquired by the camera in succession following a predetermined time interval; and a time between the first time and the second time is an integer multiple of the predetermined time interval.

21. The method according to claim 15, further comprising:

capturing, at the first time by a first camera from a first perspective relative to the associated vehicle, the first image data representative of the first image of the peripheral area of the associated vehicle;

capturing, at the second time by the first camera from the first perspective, the second image data representative of the second image of the peripheral area of the associated vehicle at the second time; and capturing, at the first time by a second camera from a second perspective relative to the associated vehicle different than the first perspective, auxiliary image data representative of an auxiliary image of the peripheral area of the associated vehicle.

22. The method according to claim 21, further comprising:

determining, by a blind spot overlap region determining unit operatively coupled with the processor, at the first time in accordance with the intrinsic blind spot data and the movement data:

a first portion of the first image in the blind spot region at the first time; and a first portion of the auxiliary image overlapping the first portion of the first image in the blind spot region at the first time, and wherein the current blind spot region restoration unit is configured to generate restored first image data by merging: i) a first portion of the auxiliary image data corresponding to the first portion of the auxiliary image overlapping the first portion of the first image in the blind spot region at the first time, with ii) the first image data at a first portion of the first image data corresponding to the first portion of the first image in the blind spot region at the first time, wherein the generated restored first image data is representative of a restored first image of the peripheral area of the associated vehicle at the first time unobstructed by the blind spot region.

23. The method according to claim 21, further comprising:

determining, by a blind spot overlap region determining unit operatively coupled with the processor in accordance with the intrinsic blind spot data and the movement data, a first portion of the auxiliary image overlapping the portion of the first image predicted to be in the blind spot region at the second time, wherein the current blind spot region restoration unit is configured to generate the restored second image data by merging: i) a first portion of the auxiliary image data corresponding to the first portion of the auxiliary image overlapping the portion of the first image predicted to be in the blind spot region at the second time, with ii) the second image data at a first portion of the second image data corresponding to the first portion of the second image in the blind spot in accordance with the intrinsic blind spot data and the movement data, wherein the generated restored second image data is representative of a restored second image of the peripheral area of the associated vehicle at the second time unobstructed by the blind spot region.

24. A method in an associated imaging system for filling in a blind spot region in a peripheral area of an associated vehicle, the method comprising:

storing intrinsic blind spot data representative of a blind spot region of a peripheral area of the associated vehicle in a non-transient memory operatively coupled with a processor of the associated imaging system;

obtaining, at a first time, first image data using an image obtaining unit operatively coupled with the processor of the associated imaging system, the first image data being representative of a first image of the peripheral area of the associated vehicle captured at a first time;

obtaining, at the first time, auxiliary image data using the image obtaining unit operatively coupled with the processor of the associated imaging system, the auxiliary image data being representative of an auxiliary image of the peripheral area of the associated vehicle captured at the first time;

determining, by a blind spot overlap region determining unit operatively coupled with the processor and in accordance with the intrinsic blind spot data:
  a first portion of the first image in the blind spot region at the first time; and
  a first portion of the auxiliary image overlapping the first portion of the first image in the blind spot region at the first time; and generating, by a current blind spot region restoration unit operatively coupled with the processor, restored first image data by merging: i) a first portion of the auxiliary image data corresponding to the first portion of the auxiliary image overlapping the first portion of the first image in the blind spot region at the first time, with ii) the first image data at a first portion of the first image data corresponding to the first portion of the first image in the blind spot region at the first time, wherein the generated restored first image data is representative of a restored first image of the peripheral area of the associated vehicle at the first time unobstructed by the blind spot region.

25. The method according to claim 24, further comprising:

generating, by an image output unit operatively coupled with the processor of the associated imaging system, a visual representation of the restored second image on an associated human readable display device in accordance with the generated restored second image data.

26. The method according to claim 24, further comprising:

capturing, by a first camera from a first perspective relative to the associated vehicle, the first image data representative of the first image of the peripheral area of the associated vehicle; and capturing, by a second camera from a second perspective relative to the associated vehicle different than the first perspective, the auxiliary image data representative of the auxiliary image of the peripheral area of the associated vehicle.

27. The method according to claim 24, further comprising:

determining, by a planarity determination unit operatively coupled with the processor, in accordance with a planarity determination model, a planarity measure of the first portion of the auxiliary image data corresponding to the first portion of the auxiliary image overlapping the first portion of the first image in the blind spot region at the first time; and determining, by a planarity assessment unit operatively coupled with the processor, a planarity conformance level of the planarity measure relative to a predetermined planarity metric; and selectively generating, by the planarity assessment unit, a planarity conformance signal in accordance with the determined planarity conformance level.

28. The method according to claim 27, wherein:

the determining the planarity measure comprises determining the planarity measure in accordance with a planarity assessment algorithm; and the merging the of the first portion of the auxiliary image data corresponding to the first portion of the auxiliary image overlapping the first portion of the first image in the blind spot comprises selectively merging, by the current blind spot region restoration, default blank image data representative of a predetermined neutral image with the first image data at a first portion of the first image data corresponding to the first portion of the first image in the blind spot region at the first time in accordance with a logical level of the planarity conformance signal.

29. A non-transitory computer readable storage medium storing one or more sequences of instructions for filling in a blind spot region in a peripheral area of an associated vehicle, wherein said instructions, when executed by one or more processors, cause the one or more processors to execute steps comprising:

storing intrinsic blind spot data representative of a blind spot region of a peripheral area of the associated vehicle in a non-transient memory operatively coupled with a processor of the associated imaging system;

storing movement data representative of a speed of movement of the associated vehicle in the non-transient memory;

obtaining, at a first time, first image data using an image obtaining unit operatively coupled with the processor of the associated imaging system, the first image data being representative of a first image of the peripheral area of the associated vehicle at the first time;

obtaining, at a second time after the first time, second image data using the image obtaining unit, the second image data being representative of a second image of the peripheral area of the associated vehicle at a second time after the first time;

determining, at the first time by a predicted blind spot region determining unit operatively coupled with the processor of the associated imaging system, a portion of the first image predicted to be in the blind spot region at the second time in accordance with the intrinsic blind spot data and the movement data; and generating, at the second time by a current blind spot region restoration unit operatively coupled with the processor of the associated imaging system, restored second image data by merging: i) a selected portion of the first image data corresponding to the portion of the first image predicted to be in the blind spot region at the second time, with ii) the second image data, wherein the generated restored second image data is representative of a restored second image of the peripheral area of the associated vehicle at the second time unobstructed by the blind spot region.

30. The non-transitory computer readable storage medium of claim 29, when executed causing the one or more processors to execute further steps comprising:

capturing, at the first time by a first camera from a first perspective relative to the associated vehicle, the first image data representative of the first image of the peripheral area of the associated vehicle;

capturing, at the second time by the first camera from the first perspective, the second image data representative of the second image of the peripheral area of the associated vehicle at the second time; and capturing, at the first time by a second camera from a second perspective relative to the associated vehicle different than the first perspective, auxiliary image data representative of an auxiliary image of the peripheral area of the associated vehicle.

31. The non-transitory computer readable storage medium of claim 30, when executed causing the one or more processors to execute further steps comprising:

determining, by a blind spot overlap region determining unit operatively coupled with the processor, at the first time in accordance with the intrinsic blind spot data and the movement data:

a first portion of the first image in the blind spot region at the first time; and a first portion of the auxiliary image overlapping the first portion of the first image in the blind spot region at the first time, and wherein the current blind spot region restoration unit is configured to generate restored first image data by merging: i) a first portion of the auxiliary image data corresponding to the first portion of the auxiliary image overlapping the first portion of the first image in the blind spot region at the first time, with ii) the first image data at a first portion of the first image data corresponding to the first portion of the first image in the blind spot region at the first time, wherein the generated restored first image data is representative of a restored first image of the peripheral area of the associated vehicle at the first time unobstructed by the blind spot region.

32. The non-transitory computer readable storage medium of claim 30, when executed causing the one or more processors to execute further steps comprising:

determining, by a blind spot overlap region determining unit operatively coupled with the processor in accordance with the intrinsic blind spot data and the movement data, a first portion of the auxiliary image overlapping the portion of the first image predicted to be in the blind spot region at the second time, wherein the current blind spot region restoration unit is configured to generate the restored second image data by merging: i) a first portion of the auxiliary image data corresponding to the first portion of the auxiliary image overlapping the portion of the first image predicted to be in the blind spot region at the second time, with ii) the second image data at a first portion of the second image data corresponding to the first portion of the second image in the blind spot in accordance with the intrinsic blind spot data and the movement data, wherein the generated restored second image data is representative of a restored second image of the peripheral area of the associated vehicle at the second time unobstructed by the blind spot region.

* * * * *